(12) United States Patent
Kurokawa et al.

(10) Patent No.: US 11,988,924 B2
(45) Date of Patent: May 21, 2024

(54) LIGHT CONTROL DEVICE AND ILLUMINATION DEVICE

(71) Applicant: Japan Display Inc., Tokyo (JP)

(72) Inventors: Tae Kurokawa, Tokyo (JP); Takeo Koito, Tokyo (JP); Masashi Mitsui, Tokyo (JP)

(73) Assignee: Japan Display Inc., Tokyo (JP)

( * ) Notice: Subject to any disclaimer, the term of this patent is extended or adjusted under 35 U.S.C. 154(b) by 132 days.

(21) Appl. No.: 17/805,330

(22) Filed: Jun. 3, 2022

(65) Prior Publication Data

US 2022/0299826 A1 Sep. 22, 2022

Related U.S. Application Data

(63) Continuation of application No. PCT/JP2020/038685, filed on Oct. 13, 2020.

(30) Foreign Application Priority Data

Dec. 11, 2019 (JP) .................................. 2019-223755

(51) Int. Cl.
*G02F 1/1343* (2006.01)
*G02F 1/1333* (2006.01)
*G02F 1/1347* (2006.01)

(52) U.S. Cl.
CPC .. *G02F 1/134309* (2013.01); *G02F 1/133345* (2013.01); *G02F 1/1347* (2013.01)

(58) Field of Classification Search
CPC ............... G02F 1/0136; G02F 1/1333; G02F 1/133345; G02F 1/1335; G02F 1/133528; G02F 1/1336; G02F 1/1337; G02F 1/133738; G02F 1/133742; G02F 1/1343; G02F 1/134309; G02F 1/134372; G02F 1/1347; G02F 2201/12

See application file for complete search history.

(56) References Cited

U.S. PATENT DOCUMENTS

| | | | |
|---|---|---|---|
| 2012/0257131 A1 | 10/2012 | Galstian et al. | |
| 2016/0077402 A1 | 3/2016 | Takehara et al. | |
| 2017/0277012 A1 | 9/2017 | Huh et al. | |

FOREIGN PATENT DOCUMENTS

| | | |
|---|---|---|
| CN | 105572885 A | 5/2016 |
| JP | 2008-76926 A | 4/2008 |
| JP | 2013-515969 A | 5/2013 |
| JP | 2016-57541 A | 4/2016 |

(Continued)

OTHER PUBLICATIONS

International Search Report dated Dec. 15, 2020 in PCT/JP2020/038685, filed on Oct. 13, 2020 citing documents AC & AR-AS therein, 2 pages.

(Continued)

*Primary Examiner* — Thoi V Duong
(74) *Attorney, Agent, or Firm* — Maier & Maier, PLLC

(57) ABSTRACT

According to one embodiment, a light control device includes a first substrate including first to third electrodes formed in an annular shape and a fourth electrode, a second substrate, and a liquid crystal layer held between the first substrate and the second substrate. The first electrode and the second electrode are arranged in a first direction. The first electrode and the third electrode are arranged in a direction different from the first direction. The fourth electrode is adjacent to the first to third electrodes.

18 Claims, 20 Drawing Sheets

(56) References Cited

FOREIGN PATENT DOCUMENTS

JP          2019-3094 A     1/2019

OTHER PUBLICATIONS

Office Action dated Jun. 13, 2023, in corresponding Chinese Application No. 202080086443.0, 7 pages.
Office Action dated Aug. 22, 2023, in corresponding Japanese Application No. 2019-223755, 10 pages.
Office Action dated Sep. 20, 2023, in corresponding Chinese Application No. 202080086443.0, 3 pages.

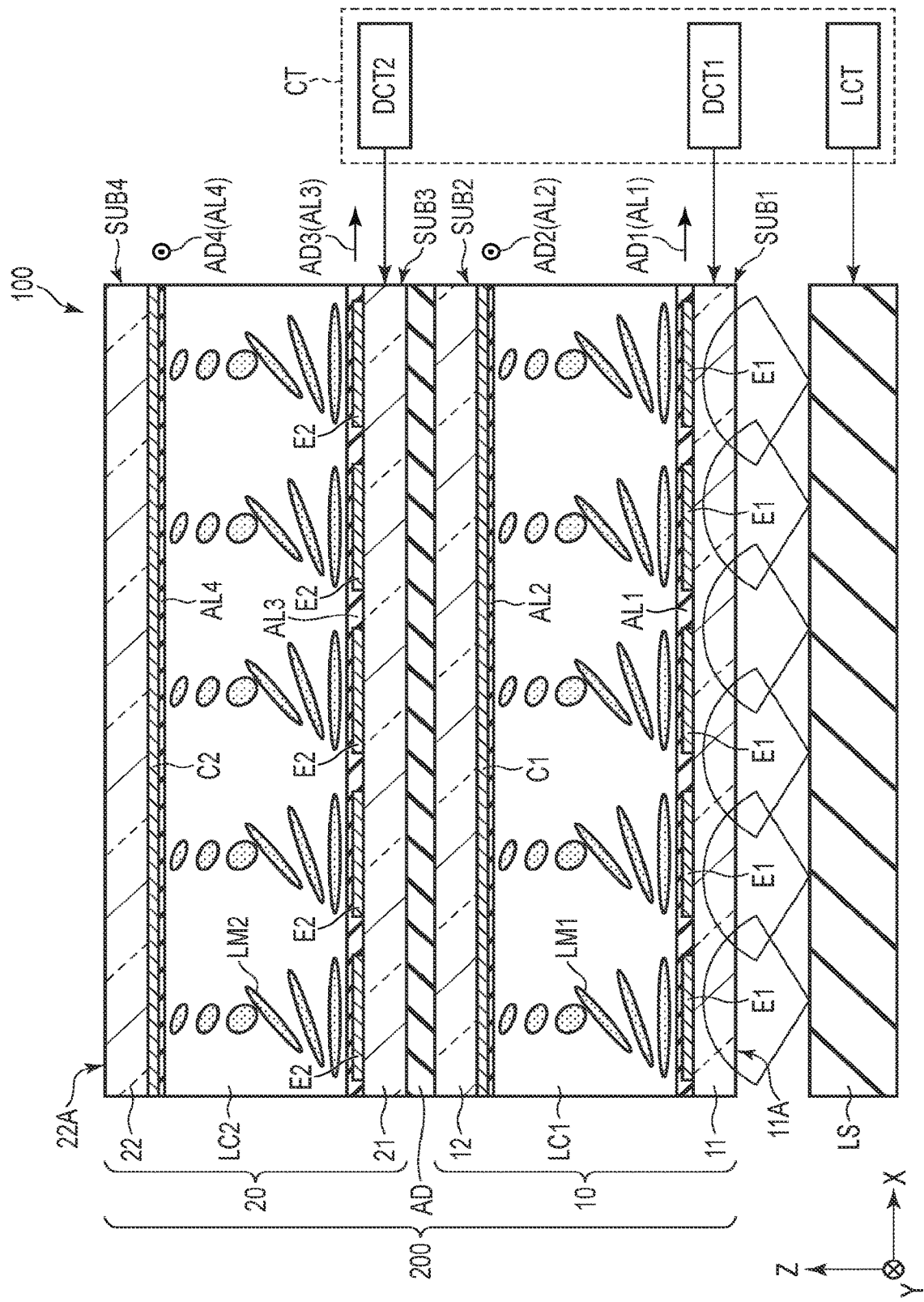
F I G. 1

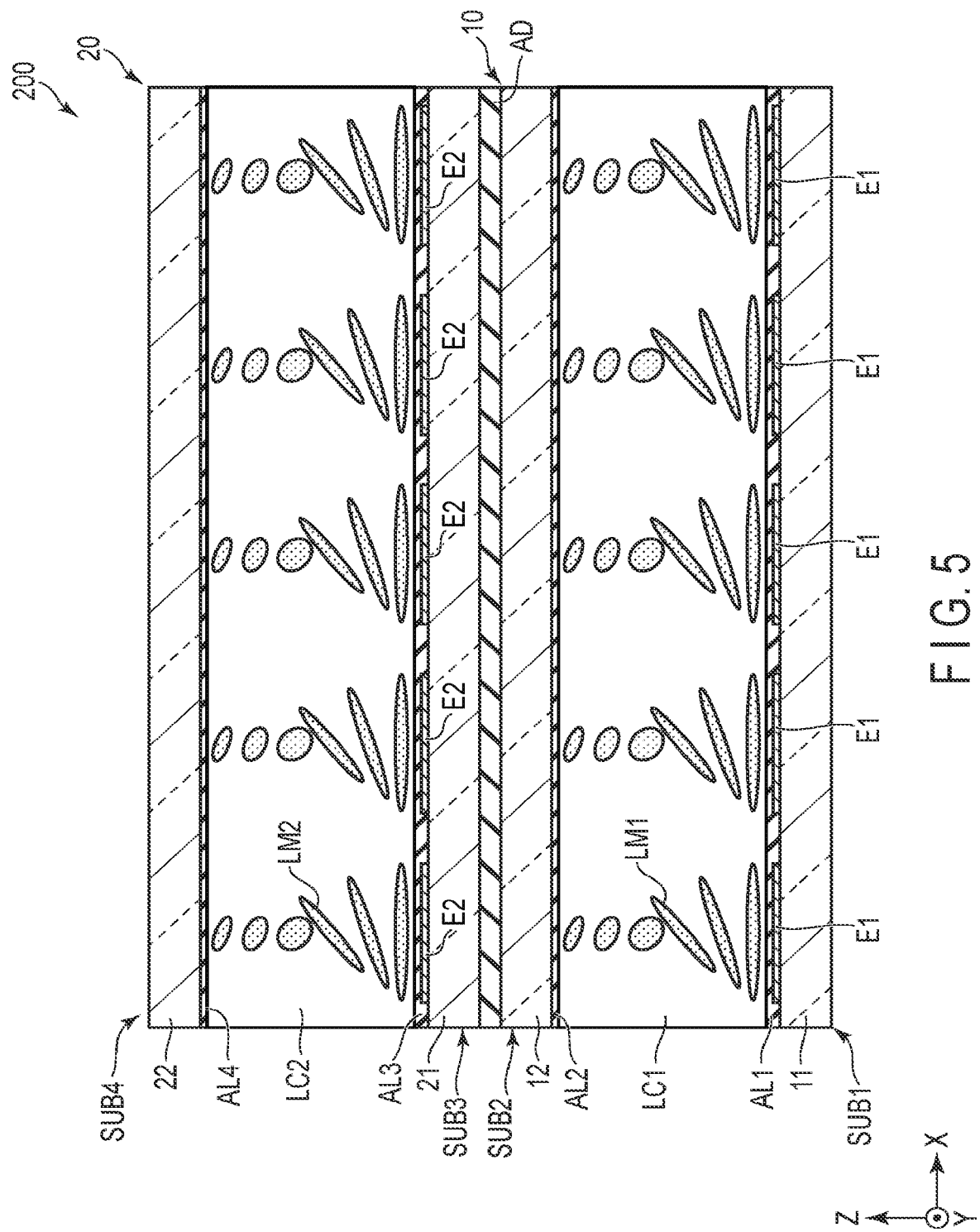
F I G. 5

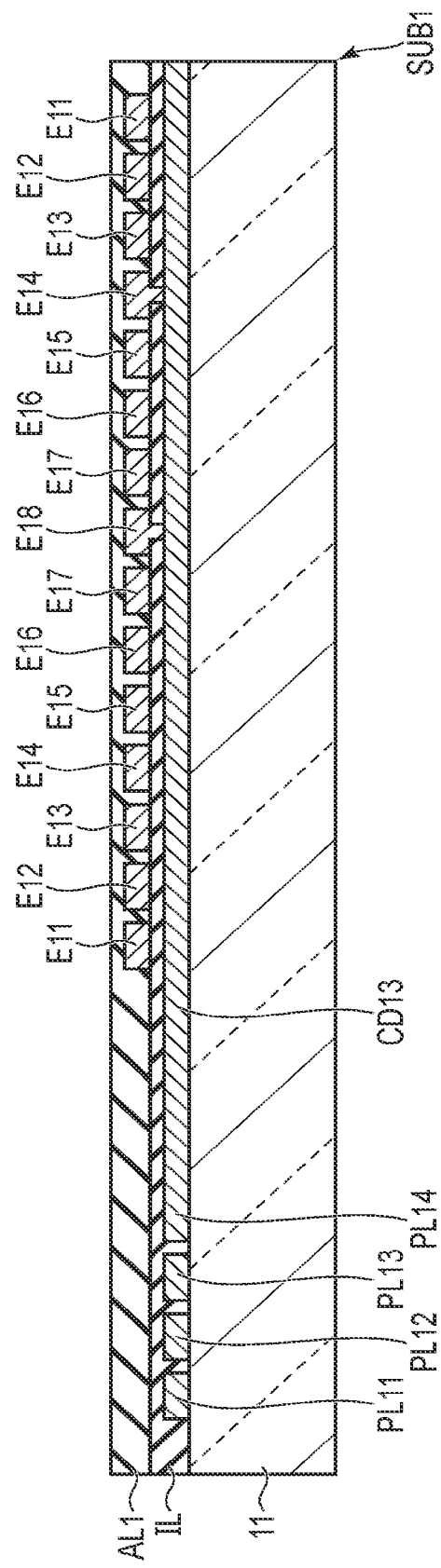
F I G. 8

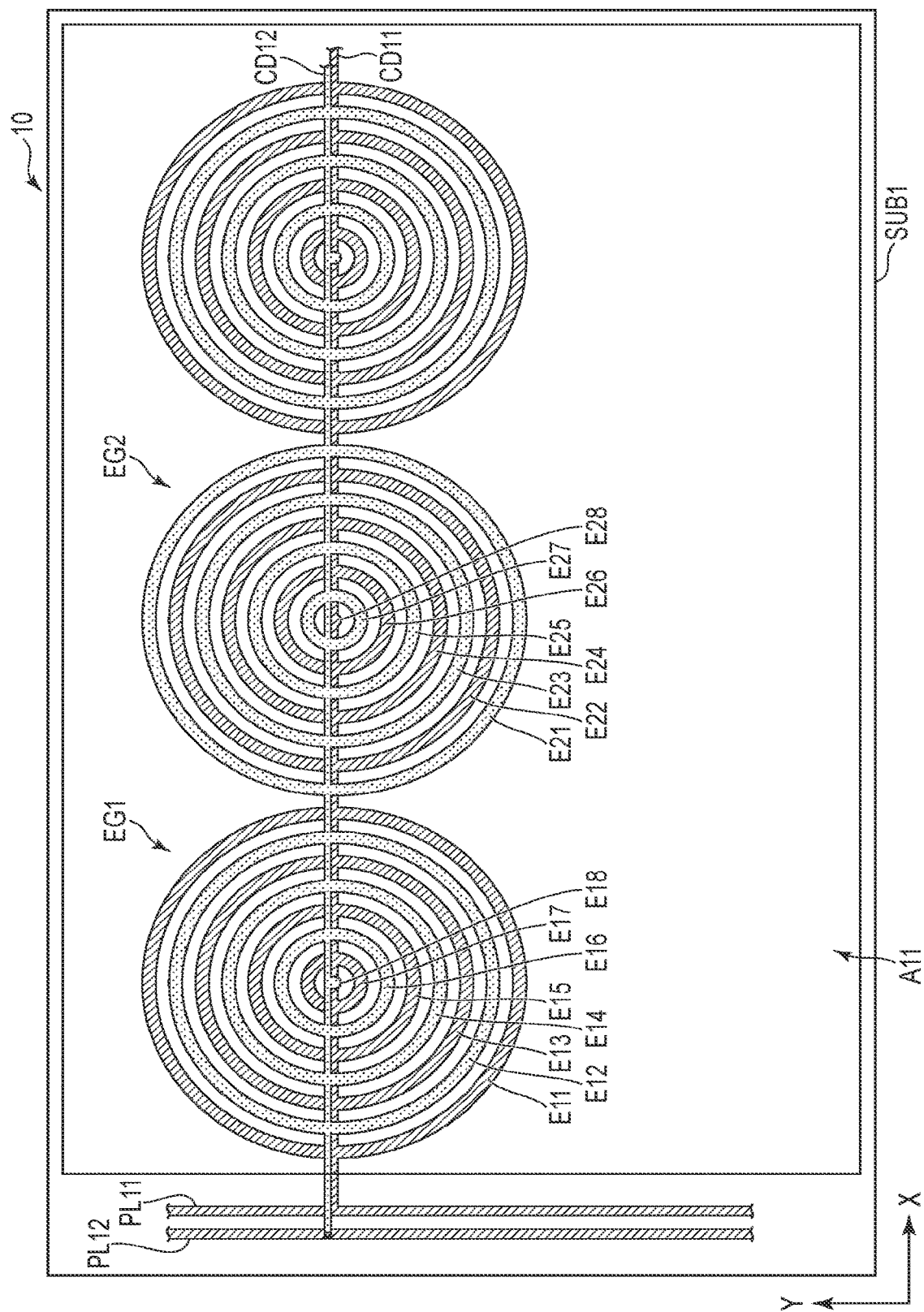

LIGHT CONTROL DEVICE AND ILLUMINATION DEVICE

CROSS-REFERENCE TO RELATED APPLICATIONS

This application is a Continuation Application of PCT Application No. PCT/JP2020/038685, filed Oct. 13, 2020 and based upon and claiming the benefit of priority from Japanese Patent Application No. 2019-223755, filed Dec. 11, 2019, the entire contents of all of which are incorporated herein by reference.

FIELD

Embodiments described herein relate generally to a light control device and an illumination device.

BACKGROUND

In recent years, a light control device using a liquid crystal cell has been proposed. Such a light control device primarily converges or diverges a polarization component. For example, a liquid crystal lens including a plurality of ring-strip electrodes and a voltage drop resistance electrode for applying a voltage resistively divided to the ring-strip electrodes has been proposed. In addition, as another example, a liquid crystal lens including transparent electrodes disposed in a plurality of fan-shaped divided regions has also been proposed.

In the light control device using the liquid crystal cell, it is desired to reduce an ineffective area that does not contribute to formation of a liquid crystal lens.

BRIEF DESCRIPTION OF THE DRAWINGS

FIG. 1 is a diagram illustrating a configuration example of an illumination device 100 in an embodiment.

FIG. 5 is a diagram illustrating another configuration example of the light control device 200.

FIG. 8 is a cross-sectional view of a first substrate SUB1 illustrated in FIG. 7 taken along a conductive line CD13.

FIG. 20 is a plan view illustrating another configuration example of the first liquid crystal cell 10.

DETAILED DESCRIPTION

Figure 2:
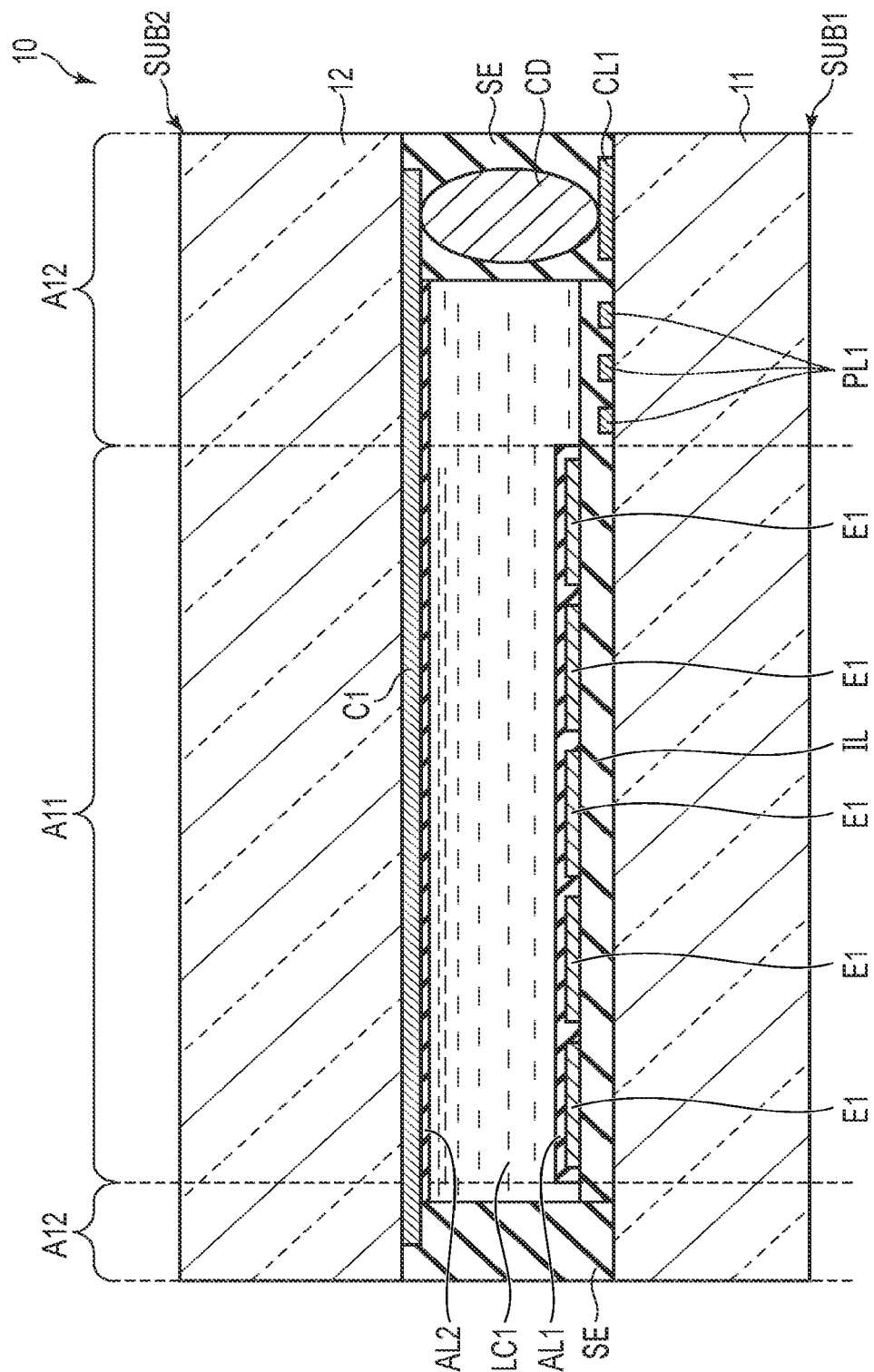
FIG. 2 is a sectional view illustrating a configuration example of a first liquid crystal cell 10.

In general, according to one embodiment, a light control device includes a first substrate including first to third electrodes formed in an annular shape and a fourth electrode, a second substrate, and a liquid crystal layer held between the first substrate and the second substrate, wherein the first electrode and the second electrode are arranged in a first direction, the first electrode and the third electrode are arranged in a direction different from the first direction, and the fourth electrode is adjacent to the first to third electrodes.

According to another embodiment, a light control device includes a first liquid crystal cell configured to control a first polarization component of incident natural light, and a second liquid crystal cell configured to control a second polarization component of the incident natural light, wherein the second liquid crystal cell overlaps the first liquid crystal cell, each of the first liquid crystal cell and the second liquid crystal cell includes first to third electrodes formed in an annular shape and a fourth electrode, the first electrode and the second electrode are arranged in a first direction, the first electrode and the third electrode are arranged in a direction different from the first direction, and the fourth electrode is adjacent to the first to third electrodes.

According to another embodiment, a light control device includes a first substrate including a first meandering electrode including a first electrode portion and a second electrode portion, a second meandering electrode including a third electrode portion, and a third meandering electrode located between the first meandering electrode and the second meandering electrode, a second substrate, and a liquid crystal layer held between the first substrate and the second substrate, wherein the first electrode portion and the second electrode portion are arranged in a first direction, the first electrode portion and the third electrode portion are arranged in a direction different from the first direction, the first electrode portion and the second electrode portion are formed in a convex shape toward the third electrode portion, the third electrode portion is formed in a convex shape toward the first electrode portion and the second electrode portion, and the third meandering electrode includes a fourth electrode portion surrounded by the first to third electrode portions.

According to another embodiment, an illumination device includes a light source, and a light control device configured to control light emitted from the light source, wherein the light control device includes a first substrate including first to third electrodes formed in an annular shape and a fourth electrode, a second substrate, and a liquid crystal layer held between the first substrate and the second substrate, the first electrode and the second electrode are arranged in a first direction, the first electrode and the third electrode are arranged in a direction different from the first direction, and the fourth electrode is adjacent to the first to third electrodes.

According to another embodiment, an illumination device includes a light source, a light control device configured to control light emitted from the light source, wherein the light control device includes a first liquid crystal cell configured to control a first polarization component of incident natural light, and a second liquid crystal cell configured to control a second polarization component of the incident natural light, the second liquid crystal cell overlaps the first liquid crystal cell, each of the first liquid crystal cell and the second liquid crystal cell includes first to third electrodes formed in an annular shape and a fourth electrode, the first electrode and the second electrode are arranged in a first direction, the first electrode and the third electrode are arranged in a direction different from the first direction, and the fourth electrode is adjacent to the first to third electrodes.

According to another embodiment, an illumination device includes a light source, and a light control device configured to control light emitted from the light source, wherein the light control device includes a first substrate including a first meandering electrode including a first electrode portion and a second electrode portion, a second meandering electrode including a third electrode portion, and a third meandering electrode located between the first meandering electrode and the second meandering electrode, a second substrate, and a liquid crystal layer held between the first substrate and the second substrate, the first electrode portion and the second electrode portion are arranged in a first direction, the first electrode portion and the third electrode portion are arranged in a direction different from the first direction, the first electrode portion and the second electrode portion are formed in a convex shape toward the third electrode portion, the third electrode portion is formed in a convex shape toward the first electrode portion and the second electrode portion, and the third meandering electrode includes a fourth electrode portion surrounded by the first to third electrode portions.

According to an embodiment, it is possible to provide a light control device and an illumination device capable of reducing an ineffective area.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a retailed description thereof is omitted unless otherwise necessary.

FIG. 1 is a diagram illustrating a configuration example of an illumination device 100 in the present embodiment. For example, a first direction X, a second direction Y, and a third direction Z are orthogonal to each other but may intersect at an angle other than 90 degrees. In the present embodiment, viewing an X-Y plane defined by the first direction X and the second direction Y is referred to as plan view.

The illumination device 100 includes a light source LS, a light control device 200 configured to control light emitted from the light source LS, and a controller CT. The light source LS emits light in the third direction Z. The light emitted from the light source LS is, for example, natural light. The light control device 200 overlaps the light source LS in the third direction Z. The light control device 200 includes a first liquid crystal cell 10 and a second liquid crystal cell 20. The first liquid crystal cell 10 and the second liquid crystal cell 20 may have substantially the same components or may have different components.

The first liquid crystal cell 10 includes a first substrate SUB1, a second substrate SUB2, and a first liquid crystal layer LC1. The first substrate SUB1 includes an insulating substrate 11, a plurality of first control electrodes E1 provided on the insulating substrate 11, and an alignment film AL1 covering the first control electrodes E1. The second substrate SUB2 includes an insulating substrate 12, a first common electrode C1 provided on the insulating substrate 12, and an alignment film AL2 covering the first common electrode C1. The first common electrode C1 is opposed to the plurality of first control electrodes E1.

The second liquid crystal cell 20 includes a third substrate SUB3, a fourth substrate SUB4, and a second liquid crystal layer LC2. The third substrate SUB3 includes an insulating substrate 21, a plurality of second control electrodes E2 provided on the insulating substrate 21, and an alignment film AL3 covering the second control electrodes E2. The second control electrodes E2 are formed to overlap the first control electrodes E1 in the third direction Z. The fourth substrate SUB4 includes an insulating substrate 22, a second common electrode C2 provided on insulating substrate 22, and an alignment film AL4 covering the second common electrode C2. The second common electrode C2 is opposed to the plurality of second control electrodes E2.

The insulating substrates 11 and 12 and the insulating substrates 21 and 22 are transparent substrates such as glass substrates or resin substrates.

The first control electrodes E1, the second control electrodes E2, the first common electrode C1, and the second common electrode C2 are transparent electrodes formed by a transparent conductive material such as indium tin oxide (ITO) or indium zinc oxide (IZO). Specific shapes and the like of the first control electrodes E1 and the second control electrodes E2 are explained below.

The alignment films AL1 to AL4 are horizontal alignment films having an alignment restriction force substantially parallel to the X-Y plane. For example, both of an alignment treatment direction AD1 of the alignment film AL1 and an alignment treatment direction AD3 of the alignment film AL3 are parallel to the first direction X. In addition, both of the alignment treatment direction AD2 of the alignment film AL2 and the alignment treatment direction AD4 of the alignment film AL4 are parallel to the second direction Y. In other words, the alignment treatment direction AD1 is orthogonal to the alignment treatment direction AD2 in the first liquid crystal cell 10 and the alignment treatment direction AD3 is orthogonal to the alignment treatment direction AD4 in the second liquid crystal cell 20. Incidentally, the alignment treatment may be rubbing treatment or photo-alignment treatment.

The first liquid crystal layer LC1 includes liquid crystal molecules LM1 that are held by the alignment films AL1 and AL2 between the first substrate SUB1 and the second substrate SUB2 and are twisted and aligned by 90 degrees. Similarly, the second liquid crystal layer LC2 includes liquid crystal molecules LM2 that are held between the third substrate SUB3 and the fourth substrate SUB4 by the alignment films AL3 and AL4 and are twisted and aligned by 90 degrees. The first liquid crystal layer LC1 and the second liquid crystal layer LC2 have, for example, positive dielectric anisotropy.

The second liquid crystal cell 20 overlaps the first liquid crystal cell 10 in the third direction Z. The insulating substrate 12 and the insulating substrate 21 are bonded to each other by a transparent adhesive layer AD. The refractive index of the adhesive layer AD is equivalent to the refractive index of the insulating substrates 12 and 21. In contrast, an outer surface 11A of the insulating substrate 11 and an outer surface 22A of the insulating substrate 22 are respectively in contact with air layers.

A controller CT includes a light source controller LCT and voltage controllers DCT1 and DCT2. A light source controller LCT controls, for example, a current value for driving the light source LS. The voltage controller DCT1 controls voltages that should be applied to the first control electrodes E1 and the first common electrode C1 in first liquid crystal cell 10. The voltage controller DCT2 controls voltages that should be applied to the second control electrodes E2 and the second common electrode C2 in the second liquid crystal cell 20.

Such a light control device 200 is provided such that the light source LS faces the outer surface 11A of the insulating substrate 11. In other words, the outer surface 11A is an incidence surface of natural light. The first liquid crystal cell 10 has a function of modulating a first polarization component of the incident natural light and converting the first polarization component into a second polarization component and converting a third polarization component of the incident natural light into a fourth polarization component without modulating the third polarization component. The second liquid crystal cell 20 has a function of modulating the fourth polarization component transmitted through the first liquid crystal cell 10 without modulating the second polarization component transmitted through the first liquid crystal cell 10.

The modulation refers to converging or diverging a polarization component transmitted through a liquid crystal layer with a refractive index distribution-type lens (hereinafter referred to as a liquid crystal lens) formed in the liquid crystal layer. A degree of convergence or divergence (a modulation factor) is controlled by a voltage applied to the liquid crystal layer. In other words, the modulation factor of the first polarization component in the first liquid crystal cell 10 is controlled by the voltage controller DCT1 and the modulation factor of the fourth polarization component in the second liquid crystal cell 20 is controlled by the voltage controller DCT2. The voltage controller DCT1 and the voltage controller DCT2 may perform the control under the same voltage condition or may perform the control under different voltage conditions. In addition, each of the voltage controller DCT1 and the voltage controller DCT2 may perform the control under a voltage condition for forming a convex lens type liquid crystal lens, a concave lens type liquid crystal lens, or a liquid crystal lens having another shape.

In addition, as explained above, the first liquid crystal cell 10 and the second liquid crystal cell 20 include substantially the same components and have equivalent rotatory power. In the present embodiment, both of the first liquid crystal cell 10 and the second liquid crystal cell 20 has rotatory power to rotate a polarization plane of an incident polarization component (linearly polarized light) by 90 degrees. In other words, a polarization plane of the first polarization component is orthogonal to a polarization plane of the second polarization component and a polarization plane of the third polarization component is orthogonal to a polarization plane of the fourth polarization component. When the first polarization component and the third polarization component are orthogonal to each other, the first polarization component and the fourth polarization component have the same polarization plane and the second polarization component and the third polarization component have the same polarization plane.

When a direction of travel of light is along the third direction Z, a polarization component having a polarization plane along the first direction X is referred to as first polarized light (P-polarization) POL1 and a polarization component having a polarization plane along the second direction Y is referred to as second polarization (S-polarization) POL2. For example, the first polarization component and the fourth polarization component are the first polarized light POL1 and the second polarization component and the third polarization component are the second polarized light POL2.

FIG. 2 is a sectional view illustrating a configuration example of the first liquid crystal cell 10. Although first liquid crystal cell 10 is explained here, the second liquid crystal cell 20 has the same cross-sectional structure as first liquid crystal cell 10. Explanation of the sectional structure is omitted.

The first liquid crystal cell 10 has an effective area A11 for modulating a transmitted polarization component and a peripheral area A12 on the outer side of the effective area A11. In the first substrate SUB1, a plurality of first feeder lines PL1 and a common wire CL1 are provided in the peripheral area A12 and covered with an insulating film IL. The plurality of first control electrodes E1 are provided in the effective area A11, located on the insulating film IL, and covered with the alignment film AL1. The first control electrode E1, the feeder line PL1, and the common wire CL1 are electrically connected to the voltage controller DCT1 illustrated in FIG. 1.

In the second substrate SUB2, the first common electrode C1 is a single plate electrode located on substantially the entire surface of the effective area A11 and partially extending to the peripheral area A12. The first common electrode C1 is opposed to the plurality of first control electrodes E1 via the first liquid crystal layer LC1 in the effective area A11. The first common electrode C1 is opposed to the plurality of feeder lines PL1 and the common wire CL1 in the peripheral area A12.

The first substrate SUB1 and the second substrate SUB2 are bonded by sealant SE in the peripheral area A12. The sealant SE includes a conductive material CD. The conductive material CD is interposed between the common wire CL1 and the first common electrode C1 and electrically connects the common wire CL1 and the first common electrode C1.

Figure 3:
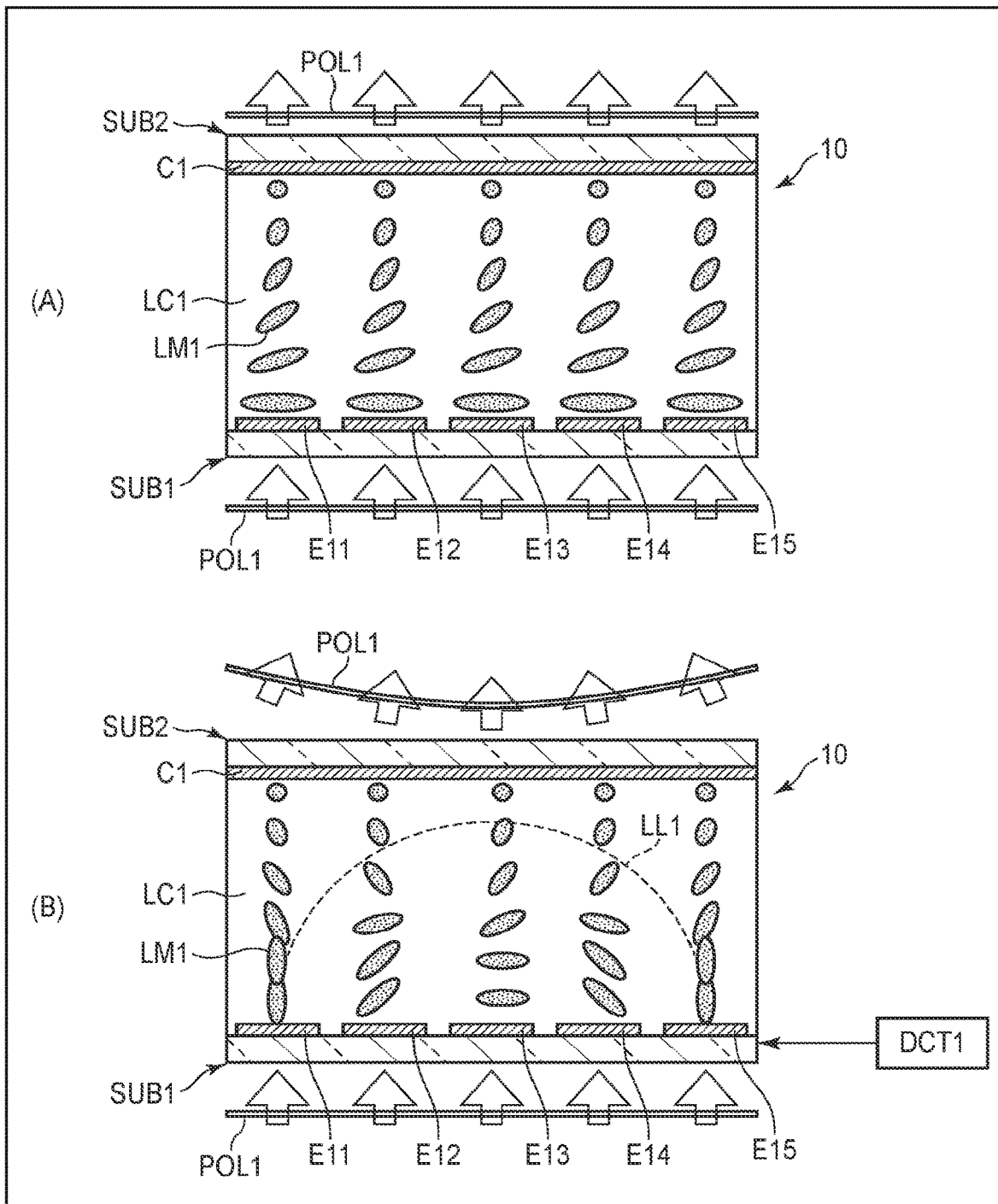
FIG. 3 is a diagram for explaining a liquid crystal lens LL1 formed in the first liquid crystal cell 10.

FIG. 3 is a diagram for explaining the liquid crystal lens LL1 formed in first liquid crystal cell 10. In FIG. 3, only a configuration necessary for explanation is illustrated. Incidentally, although explanation is omitted, the same liquid crystal lens LL2 as the liquid crystal lens LL1 explained with reference to FIG. 3 can also be formed in the second liquid crystal cell 20.

FIG. 3A illustrates an OFF state (OFF) in which no potential difference is generated between first control electrodes E11 to E15 and the first common electrode C1. The liquid crystal molecules LM1 contained in the first liquid crystal layer LC1 are twisted and aligned by alignment restriction forces of the alignment films A11 and AL2.

FIG. 3B illustrates an ON state (ON) in which a potential difference is formed between the first control electrodes E11 to E15 and the first common electrode C1. The voltage controller DCT1 supplies predetermined voltages respectively to the first control electrodes E11 to E15 and the first common electrode C1. The first liquid crystal layer LC1 has positive dielectric anisotropy as explained above. For this reason, the liquid crystal molecules LM1 are aligned such that the major axis thereof is along an electric field in a state where the electric field is formed.

Since an electric field along the third direction Z is formed in a region where each of the first control electrodes E11 and E15 and the first common electrode C1 face each other, the liquid crystal molecules LM1 are aligned such that the major axis thereof is along the third direction Z. In a region where the first control electrode E13 and the first common electrode C1 face each other, an electric field is hardly formed and the liquid crystal molecules LM1 are maintained in an initial alignment state (a twisted alignment state). In a region where the first control electrode E12 and the first common electrode C1 face each other, an intermediate alignment state between a region where the first control electrode E11 and the first common electrode C1 face each other and the region where the first control electrode E13 and the first common electrode C1 face each other is formed. In a region where the first control electrode E14 and the first common electrode C1 face each other, an intermediate alignment state between a region where the first control electrode E15 and the first common electrode C1 face each other and the region where the first control electrode E13 and the first common electrode C1 face each other is formed.

The liquid crystal molecules LM1 have refractive anisotropy $\Delta n$. For this reason, the first liquid crystal layer LC1 has a refractive index distribution corresponding to the alignment state of liquid crystal molecules LM1. Alternatively, the first liquid crystal layer LC1 has a distribution of retardation represented by $\Delta n \cdot d$, where d is a thickness of first liquid crystal layer LC1 along third direction Z. The liquid crystal lens LL1 indicated by a dotted line in the drawing is formed by such a refractive index distribution or a retardation distribution.

A case where the first liquid crystal layer LC1 includes the liquid crystal lens LL1 in the first liquid crystal cell 10 and the second liquid crystal layer LC2 includes the liquid crystal lens LL2 in the second liquid crystal cell 20 is explained. The light source LS emits natural light including the first polarized light POL1 and the second polarized light POL2.

In the first liquid crystal cell 10, the first polarized light (first polarization component) POL1 of the natural light is subjected to lens action by the liquid crystal lens LL1 and a polarization plane thereof is rotated by 90 degrees and converted into the second polarized light (second polarization component) POL2. In addition, the second polarized light (third polarization component) POL2 of the natural light is transmitted without being subjected to the lens action by the liquid crystal lens LL1 and a polarization plane thereof is rotated by 90 degrees and converted into the first polarized light. (fourth polarization component) POL1.

In second liquid crystal cell 20, the second polarized light (second polarization component) POL2 transmitted through the first liquid crystal cell 10 is transmitted without being subjected to lens action by the liquid crystal lens LL2 and a polarization plane thereof is rotated by 90 degrees and converted into the first polarized light POL1. In addition, the first polarized light (fourth polarization component) POL1 transmitted through the first liquid crystal cell 10 is subjected to the lens action by the liquid crystal lens LL2 and a polarization plane thereof is rotated by 90 degrees and converted into the second polarized light POL2.

In other words, the first polarized light POL1 of the natural light emitted from the light source LS is primarily subjected to the lens action in the first liquid crystal cell 10 and the second polarized light POL2 of the natural light emitted from the light source LS is primarily subjected to the lens action in the second liquid crystal cell 20.

Figure 4:
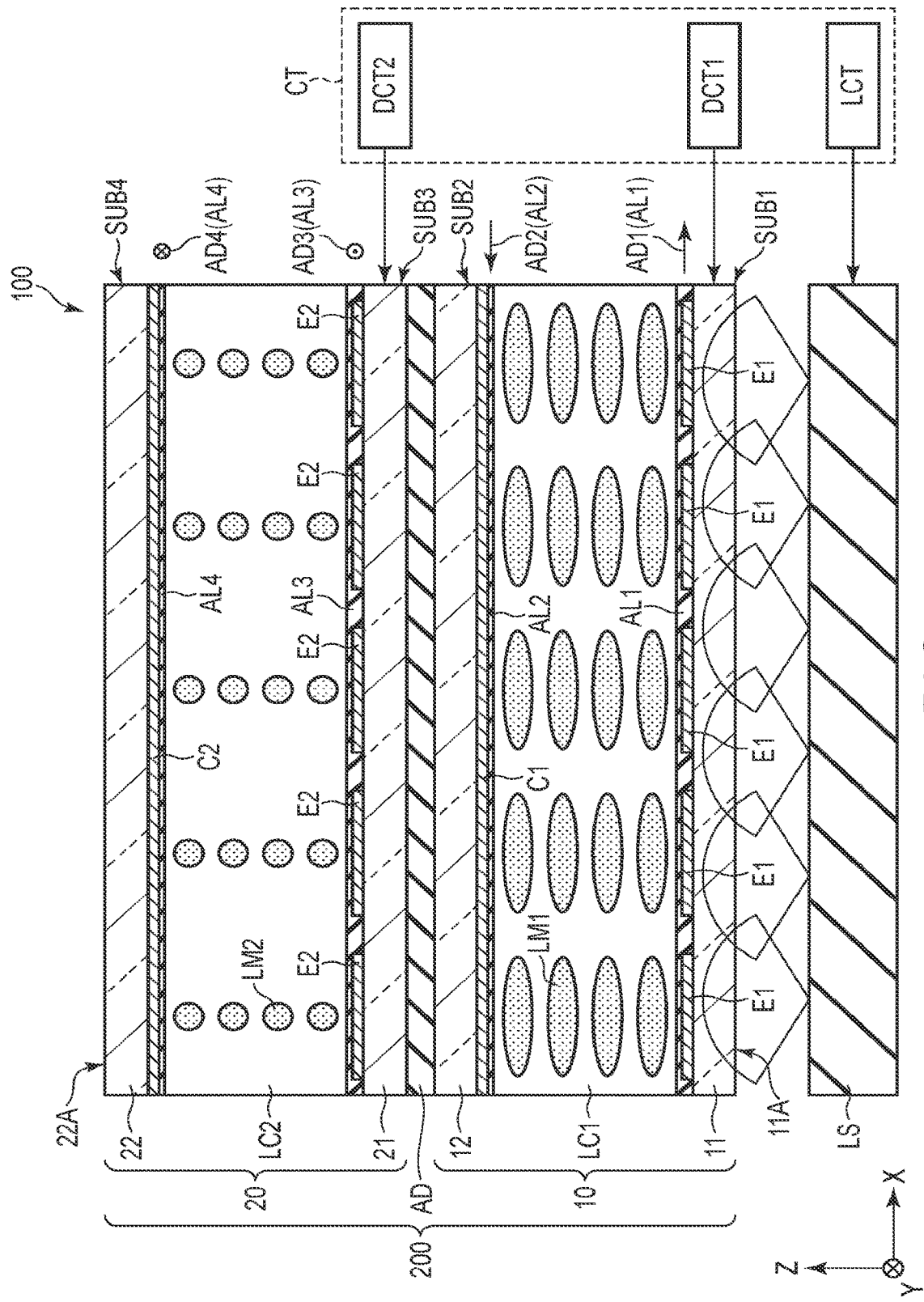
FIG. 4 is a diagram illustrating another configuration example of a light control device 200.

FIG. 4 is a diagram illustrating another configuration example of the light control device 200. The configuration example illustrated in FIG. 4 is different compared with the configuration example illustrated in FIG. 1 in that the liquid crystal molecules LM1 of the first liquid crystal layer LC1 and the liquid crystal molecules LM2 of the second liquid crystal layer LC2 are homogeneously aligned (horizontally aligned). For example, both of the alignment treatment direction AD1 of the alignment film AL1 and the alignment treatment direction AD2 of the alignment film AL2 are parallel to the first direction X and are opposite to each other. In addition, both of the alignment treatment direction AD3 of the alignment film AL3 and the alignment treatment direction AD4 of the alignment film AL4 are parallel to the second direction Y and are opposite to each other. For this reason, in first liquid crystal cell 10, the liquid crystal molecules LM1 are initially aligned along the first direction X and, in second liquid crystal cell 20, the liquid crystal molecules LM2 are initially aligned along the second direction Y. In other words, an initial alignment direction of the liquid crystal molecules LM1 intersects an initial alignment direction of the liquid crystal molecules LM2. Even in such a configuration example, by controlling a voltage applied to each of the first liquid crystal layer LC1 and the second liquid crystal layer LC2, it is possible to form a liquid crystal lens that functions equivalently to the configuration example explained above.

FIG. 5 is a diagram illustrating another configuration example of the light control device 200. The configuration example illustrated in FIG. 5 is different compared with the configuration example illustrated in FIG. 1 in that the first common electrode C1 of the first liquid crystal cell 10 is omitted and the second common electrode C2 of the second liquid crystal cell 20 is omitted. In such a configuration example, a liquid crystal lens is formed by a so-called lateral electric field system for forming an electric field between the adjacent first control electrodes E1 in the first liquid crystal cell 10 and, similarly, a liquid crystal lens is formed by an electric field between the adjacent second control electrodes E2 in the second liquid crystal cell 20. Incidentally, the initial alignment of the liquid crystal molecules LM1 and the liquid crystal molecules LM2 may be a twist alignment in the configuration example illustrated in FIG. 1 or may be a horizontal alignment in the configuration example illustrated in FIG. 4.

Figure 6:
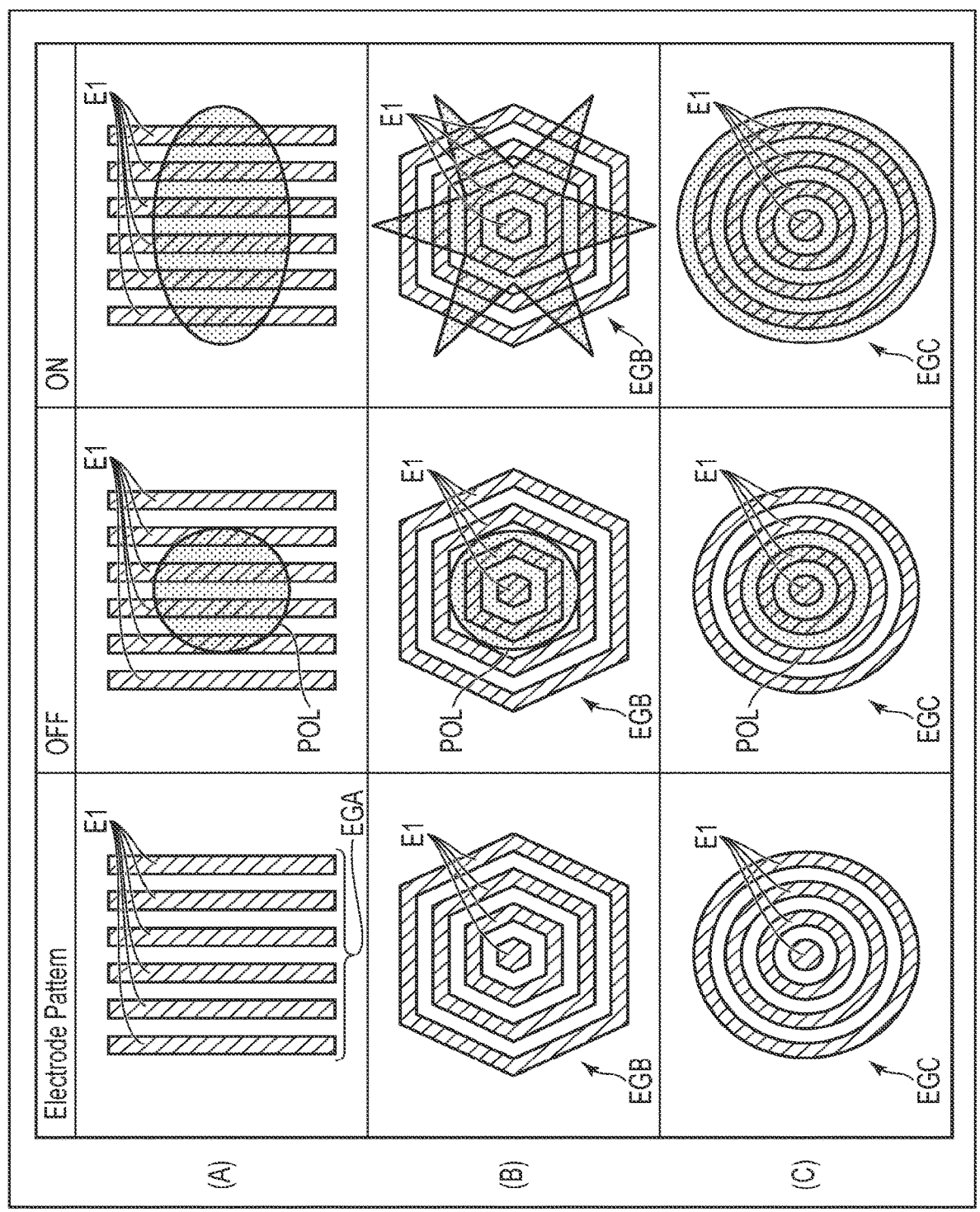
FIG. 6 is a diagram for explaining light diverging action by a first control electrode E1.

FIG. 6 is a diagram for explaining light diverging action by the first control electrode E1. Incidentally, although the action of the first control electrode E1 will be described here, in a case where the second control electrode E2 is formed in the same shape as the first control electrode E1, the same action as the action of the first control electrode E1 is exerted also in the second control electrode E2.

An electrode group EGA in an example illustrated in an upper part (A) of FIG. 6 is configured by a plurality of linear first control electrodes E1. The plurality of first control electrodes E1 have the same shape and are arranged at substantially regular pitches. In the OFF state (OFF) in which no electric field is formed between the adjacent first control electrodes E1 or between the first control electrode E1 and the not-illustrated first common electrode, the polarization component POL made incident on the electrode group EGA is hardly diverged and is transmitted. In the ON state (ON) in which an electric field is formed between the adjacent first control electrodes E1 or between the first control electrode E1 and the not-illustrated first common electrode, the liquid crystal lens as explained with reference to FIG. 3B is formed and the polarization component POL made incident on the electrode group EGA is diverged in a direction substantially orthogonal to an extending direction of the first control electrode E1 (alternatively, a direction in which the plurality of first control electrodes E1 are arranged). In the illustrated example, the plurality of first control electrodes E1 are unidirectionally arranged and the polarization component POL is diverged in one direction.

An electrode group EGB of an example illustrated in a middle part (B) of FIG. 6 is configured by a plurality of annular first control, electrodes E1. In the illustrated example, each of the first control electrodes E1 is formed in a hexagonal shape which is an example of a polygonal shape. The shapes of the plurality of first control electrodes E1 are geometrically similar and the first control electrode E1 on the inner side is smaller than the first control electrode E1 on the outer side. In the ON state (ON), the polarization component POL made incident on the electrode group EGB is diverged in a direction substantially orthogonal to an extending direction of sides of the first control electrode E1. In the illustrated example, each of the first control electrodes E1 has six sides and the polarization component POL is diverged in six directions.

An electrode group EGC in an example illustrated in a lower part (C) of FIG. 6 is configured by a plurality of annular first control electrodes E1. In the illustrated example, each of the first control electrodes E1 is formed in a circular shape. The shapes of the plurality of first control electrodes E1 are geometrically similar and the first control electrode E1 on the inner side is smaller than the first control electrode E1 on the outer side. In the ON state (ON), the polarization component POL4 made incident on the electrode group EGC is diverged in a direction in which the plurality of first control electrodes E1 are arranged. In the illustrated example, the polarization component POL is diverged in all directions.

Figure 7:
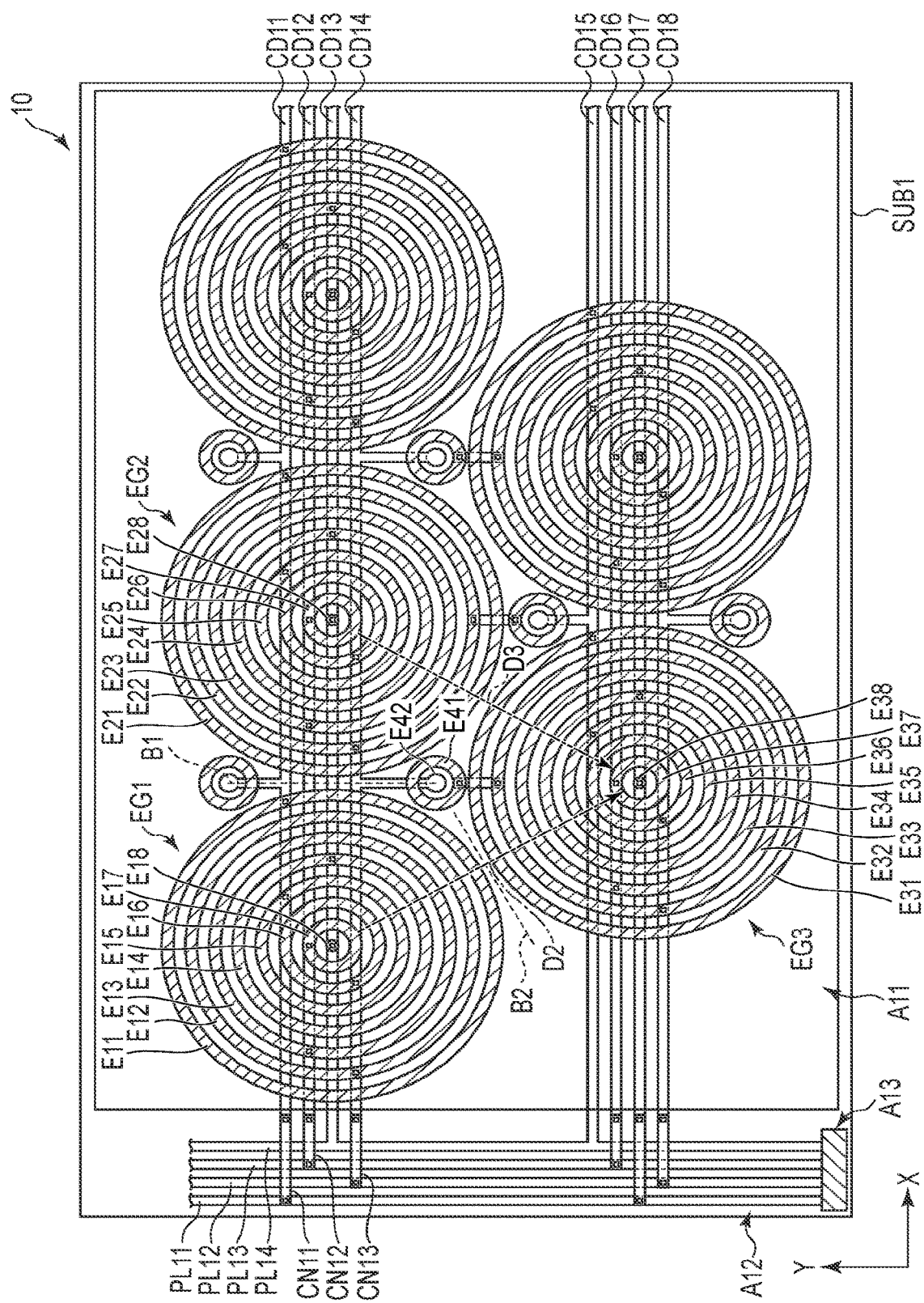
FIG. 7 is a plan view illustrating a configuration example of the first liquid crystal cell 10.

FIG. 7 is a plan view illustrating a configuration example of the first liquid crystal cell 10. Incidentally, in FIG. 7, only the main portion of the first liquid crystal cell 10 is illustrated.

The first substrate SUB1 of the first liquid crystal cell 10 includes a plurality of feeder lines PL11 to PL14, a plurality of conductive lines CD11 to CD18, and a plurality of electrode groups EG to EG3. The feeder lines PL11 to PL14 and the conductive lines CD11 to CD18 are provided in the same layer. An insulating film explained below is interposed between the conductive lines CD11 to CD18 and the electrode groups EG1 to EG3. In FIG. 7, a square in a position where two conductive layers overlap indicates a connection portion where the conductive layer located below the insulating film and the conductive layer located above the insulating film are electrically connected to each other in a contact hole penetrating the insulating film.

The feeder lines PL11 to PL14 are arranged in the first direction X in the peripheral area A12. Each of the feeder lines PL11 to PL14 extends to a terminal A13. Although not explained in detail, the terminal A13 includes a plurality of terminals connected to each of the feeder lines PL1.1 to PL14 and is electrically connected to a flexible printed circuit or the like.

The conductive lines CD11 to CD18 extend along the first direction X and are arranged in the second direction Y in the effective area A11. In addition, the conductive lines CD11 to CD18 extend to the peripheral area A12 and are electrically connected to any one of the feeder lines PL11 to PL14. For example, the conductive line CD13 is formed integrally with the feeder line PL14. In addition, the conductive line CD11 is electrically connected to the feeder line PL11 via a connection line CN11. Similarly, the conductive line CD12 is connected to the feeder line PL13 via a connection line CN12 and the conductive line CD14 is connected to the feeder line PL12 via a connection line CN13. These connection lines CN11 to CN13 are conductive layers provided in the same layer as the electrode groups EG1 to EG3.

Each of the electrode groups EG1 to EG3 is configured by a plurality of first control electrodes E1 formed in a concentric circle shape. The electrode group EG1 is configured by eight first control electrodes E11 to E18. All of the first control electrodes E11 to E17 are formed in a circular shape and has equivalent widths. In addition, a shape of the first control electrode E18 located substantially in the center of the electrode group EG1 is a circle. The first control electrodes E11 to E17 are arranged toward the first control electrode E18 at substantially regular pitches in the radial direction. The first control electrodes E11 and E15 are electrically connected to the conductive line CD11. The first control electrodes E12 and E16 are electrically connected to the conductive line CD14. The first control electrodes E13 and E17 are electrically connected to the conductive line CD12. The first control electrodes E14 and E18 are electrically connected to the conductive line CD13.

Similarly to the electrode group EG1, the electrode group EG2 is configured by eight first control electrodes E21 to E28. The first control electrodes E21 and E25 are electrically connected to the conductive line CD11. The first control electrodes E22 and E26 are electrically connected to the conductive line CD14. The first control electrodes E23 and E27 are electrically connected to the conductive line CD12. The first control electrodes E24 and E28 are electrically connected to the conductive line CD13.

The conductive lines CD11 to CD14 intersect the first control electrodes E11 to E18 and the first control electrodes E21 to E28.

Similarly to the electrode group EG11, the electrode group EG3 is configured by eight first control electrodes E31 to E38. The first control electrodes E31 and E35 are electrically connected to the conductive line CD15. The first control electrodes E32 and E36 are electrically connected to the conductive line CD18. The first control electrodes E33 and E37 are electrically connected to the conductive line CD16. The first control electrodes E34 and E38 are electrically connected to the conductive line CD17.

The conductive lines CD15 to CD18 intersect the first control electrodes E31 to E38.

Incidentally, the number of first control electrodes configuring the electrode groups is not limited to the illustrated example.

These electrode groups EG1 to EG3 are disposed to form a close-packed structure on the X-Y plane. In other words, the first control electrodes E18, E28, and E38 are provided to be located at vertexes of a regular triangle. The electrode groups EG1 and EG2 are arranged in the first direction X. The electrode groups EG1 and EG3 are arranged in a direction D2 different from the first direction X and the second direction Y (alternatively, a direction intersecting the first direction X and the second direction Y) on the X-Y plane. The electrode groups EG2 and EG3 are arranged in a direction D3 different from all of the first direction X, the second direction Y, and the direction D2 on the X-Y plane. The direction D2 is indicated by an alternate long and short dash line in the drawing and the direction D3 is indicated by an alternate long and two short dashes line in the drawing.

In such a configuration example, for example, the first control electrode E11 is equivalent to a first electrode, the first control electrode E21 is equivalent to a second electrode, and the first control electrode E31 is equivalent to a third electrode. In addition, the conductive line CD11 is equivalent to a first conductive line and the conductive line CD15 is equivalent to a second conductive line.

Focusing on the second electrode E21, and the third electrode E31, the first electrode E11 and the second electrode E21 are line symmetry with respect to a first symmetry axis B1 orthogonal to the first direction X. In addition, the first electrode E11 and the third electrode E31 are line symmetry with respect to a second symmetry axis B2 different from the first symmetry axis B1. The second symmetry axis B2 is orthogonal to the direction D2.

A fourth electrode E41 is located on the inner side surrounded by the first electrode E11, the second electrode E21, and the third electrode E31. In other words, the fourth electrode E41 is provided in a gap of the electrode groups EG1 to EG3 disposed to form a close-packed structure and is adjacent to the first electrode E11, the second electrode E21, and the third electrode E31. The fourth electrode E41 is formed in a circular shape smaller than all of the first electrode E11, the second electrode E21, and the third electrode E31. The electric potential of the fourth electrode E41 is set to be different from the electric potential of an electrode adjacent thereto.

In addition, the fourth electrode E41 is located between the conductive line CD14 closest to the electrode group EG3 among the conductive lines CD11 to CD14 and the conductive line CD15 closest to the electrode groups EG1 and EG2 among the conductive lines CD15 to CD18. The fourth electrode E41 is electrically connected to the first control electrode E32. In other words, the electric potential of the fourth electrode E41 is different from the electric potentials of all of the first electrode E11, the second electrode E21, and the third electrode E31. The electrode E42 is located on the inner side the fourth electrode E41 and is electrically connected to the conductive line CD14. The electric potential of the electrode E42 is different from the electric potential of the fourth electrode E41.

FIG. 8 is a cross-sectional view of the first substrate SUB1 illustrated in FIG. 7 taken along the conductive line CD13. The feeder lines PL11 to PL14 and the conductive line CD13 are provided on the insulating substrate 11 and covered with the insulating film IL. The first control electrodes E11 to E18 are provided on the insulating film IL and covered with the alignment film AL1. In the illustrated example, the conductive line CD13 is directly connected to the feeder line PL14. In addition, the first control electrodes E14 and E18 are connected to the conductive line CD13 in a contact hole penetrating the insulating film IL.

The feeder lines PL11 to PL14 are formed by, for example, a metal material. As explained above, the first control electrodes E11 to E18 are formed by a transparent conductive material. The conductive line CD13 is formed by, for example, a transparent conductive material but may be formed by a metal material.

In FIG. 7 and FIG. 8, the configuration example of the first liquid crystal cell 10 is explained. However, the second liquid crystal cell 20 is configured the same.

According to the present embodiment, different voltages are applied to the adjacent first control electrodes or different voltages are applied to the first control electrode and the first common electrode, whereby the liquid crystal lens is formed. The polarization component made incident on the electrode groups is scattered in all directions and the polarization component made incident on the gap surrounded by the plurality of electrode groups is also scattered in all directions. Therefore, in the effective area, an ineffective area not contributing to the formation of the liquid crystal lens can be reduced.

In addition, light transmitted through the ineffective area is reduced and light made incident on the effective area can be efficiently scattered.

Further, the conductive lines CD11 to CD14 are provided to pass substantially the center of the electrode groups EG1 and EG2 and the conductive lines CD15 to CD18 are provided to pass substantially the center of the electrode group EG3. For this reason, it is possible to suppress disorder in alignment of liquid crystal molecules due to a leakage field from conductive lines compared with when the conductive lines are provided in the gap surrounded by the electrode groups EG1 to EG3. Therefore, a desired liquid crystal lens is formed in the electrode groups.

Next, another configuration example is explained.

Figure 9:
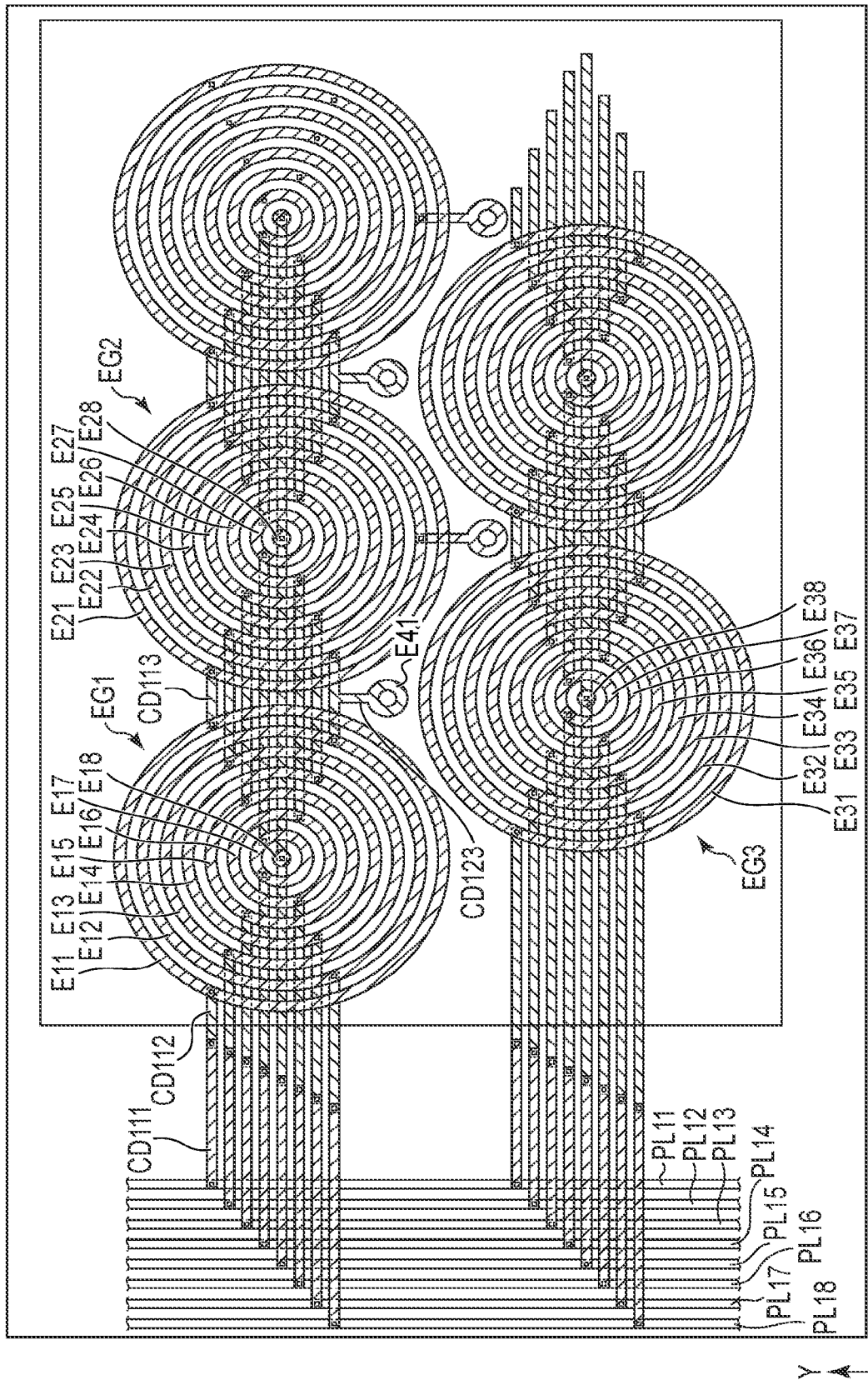
FIG. 9 is a plan view illustrating another configuration example of the first liquid crystal cell 10.

FIG. 9 is a plan view illustrating another configuration example of the first liquid crystal cell 10. In FIG. 9, similarly to the feeder lines PL11 to PL18, members indicated by right-upward diagonal hatch lines are conductive layers between the insulating substrate 11 and the insulating film IL in FIG. 8. In addition, in FIG. 9, members indicated by right-downward diagonal hatch lines are conductive layers between the insulating film IL and the alignment film AL1 in FIG. 8 like the first control electrodes E11 to E18 and the like.

In the electrode group EG1, the first control electrodes E11 to E18 are electrically connected to any one of the feeder lines PL11 to PL18. For example, the first control electrode E11 is electrically connected to the feeder line PL11 via a plurality of conductive lines CD111 and CD112. The conductive line CD11 is a conductive layer located in the same layer as the first control electrode E11. The conductive line CD112 is a conductive layer located in a layer different from the first control electrode E11 and located in the same layer as the feeder line PL11. The conductive line CD111 is electrically connected to the feeder line PL11 at one end portion thereof and is electrically connected to the conductive line CD112 at the other end portion thereof. The conductive line CD112 is electrically connected to the conductive line CD111 at one end portion thereof and is electrically connected to the first control electrode E11 at the other end portion thereof. Incidentally, concerning the connection of the first control electrode E11 and the feeder line PL11, the conductive line CD111 may be omitted and the conductive line CD112 may be formed integrally with the feeder line PL11.

In the electrode group EG2, the first control electrodes E21 to E28 are respectively electrically connected to the first control electrodes E11 to E18. For example, the first control electrode E21 is electrically connected to the first control electrode E11 via the conductive line CD113.

The fourth electrode E41 surrounded by the first electrode E11, the second electrode E21, and the third electrode E31 is connected to a conductive line CD123. The conductive line CD123 is a conductive line that electrically connects the first control electrode E12 and the first control electrode E22. The fourth electrode E41 is equivalent to an electrode to which a voltage different from voltages applied to the first electrode E11, the second electrode E21, and the third electrode E31 is applied. The electric potential of the fourth electrode E41 is different from the electric potential of the adjacent electrodes (the first electrode E11, the second electrode E21, and the third electrode E31).

In such a configuration example as well, the same effects as those of the configuration example explained above can be obtained. In addition, the conductive line overlapping the electrode groups is shortened. A leakage field from the conductive line can be suppressed. In addition, the wiring length of the conductive line can be shortened. The load on the conductive line can be reduced. In addition, an intersection of the conductive line and the first control electrode can be reduced. Parasitic capacitance can be reduced.

Figure 10:
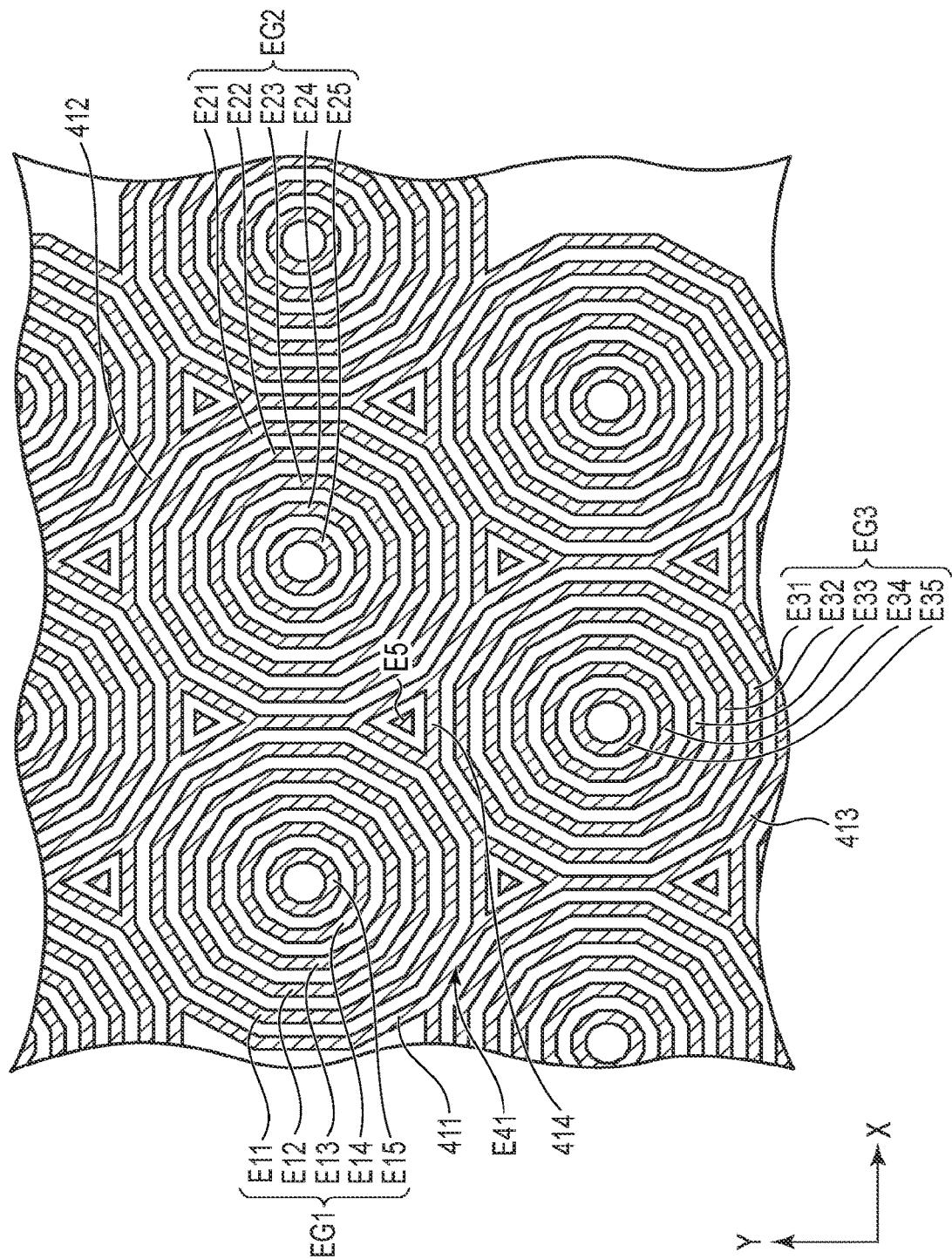
FIG. 10 is a plan view illustrating another configuration example of a first control electrode.

FIG. 10 is a plan view illustrating another configuration example of the first control electrode.

Each of the electrode groups EG1 to EG3 is configured by a plurality of first control electrodes E1 formed in an annular shape. The electrode group EG1 is configured by five first control electrodes E11 to E15. All of the first control electrodes E11 to E15 are formed in a polygonal shape and are formed in a dodecagonal shape in the illustrated example. The shape of each of the first control electrodes E11 to E15 is geometrically similar. The electrodes on the inner side are smaller.

Like the electrode group EG1, the electrode group EG2 is configured by five first control electrodes E21 to E25. Although not illustrated, the first control electrodes E11 to E15 are respectively electrically connected to the first control electrodes E21 to E25. Like the electrode group EG1, the electrode group EG3 is configured by five first control electrodes E31 to E35. The first control electrodes E31 to E35 respectively the same electric potentials as the electric potentials of the first control electrodes E11 to E15. These electrode groups EG1 to EG3 are disposed to form a close-packed structure as in the configuration example illustrated in FIG. 7.

The fourth electrode E41 is adjacent to the first electrode E11, the second electrode E21, and the third electrode E31. The fourth electrode E41 includes annular portions 411 to 414 formed in an annular shape. The annular portion 411 surrounds the electrode group EG1 including the first electrode E11, the annular portion 412 surrounds the electrode group EG2 including the second electrode E21, and the annular portion 413 surrounds the electrode group EG3 including the third electrode E31. The annular portion 414 is surrounded by the first electrode E11, the second electrode E21, and the third electrode E31. The annular portion 414 is equivalent to a part formed in a polygonal shape different from the first electrode E11 and the like. The electrode E51 on the inner side of the annular portion 414 is formed in a triangular shape and has electric potential different from the electric potential of the fourth electrode E41. The shape of the fourth electrode E41 is further explained with reference to FIG. 11.

Figure 11:
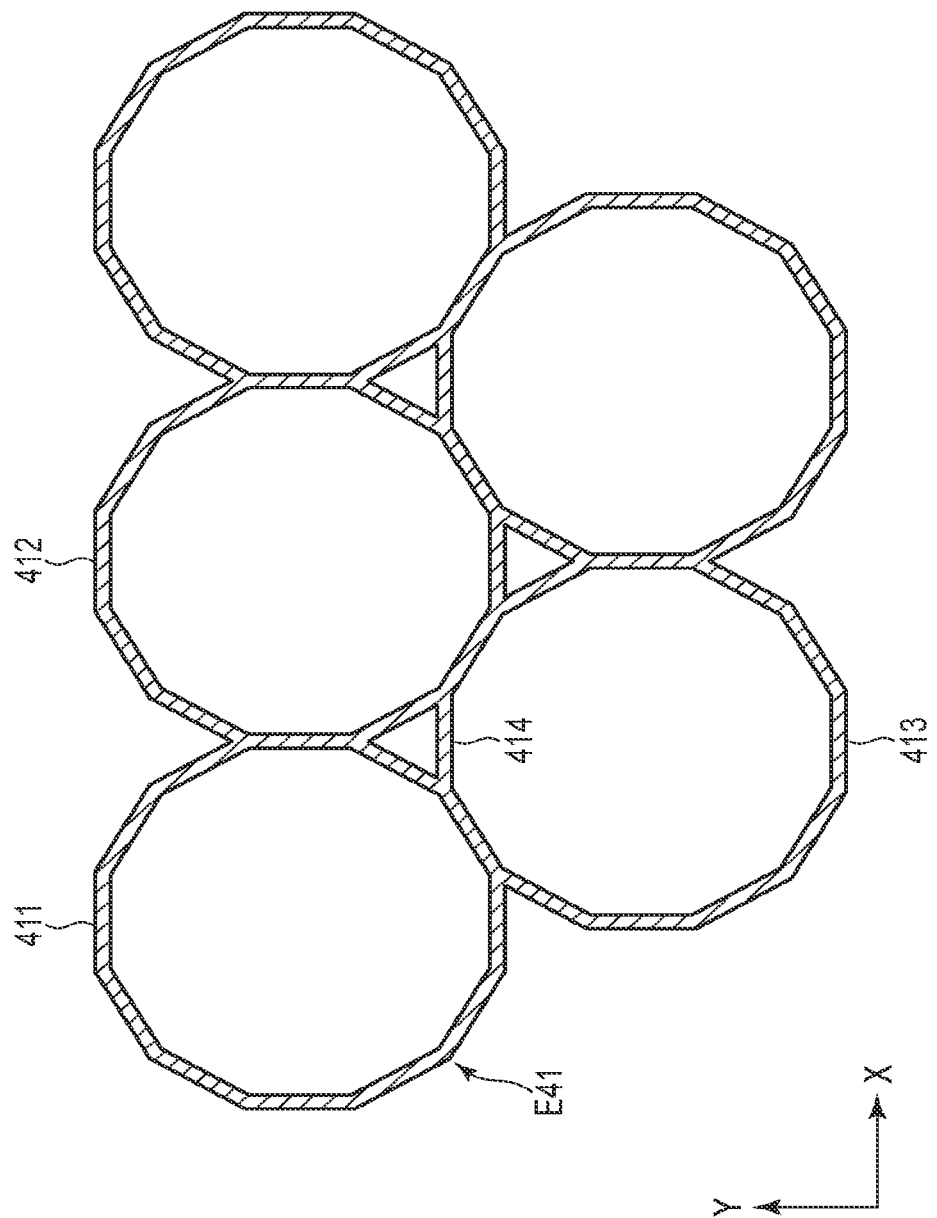
FIG. 11 is a plan view illustrating a fourth electrode E41 illustrated in FIG. 10.

FIG. 11 is a plan view illustrating the fourth electrode E41 illustrated in FIG. 10. The annular portions 411 to 413 are respectively formed in a dodecagonal shape and are integrated to share one side with one another. The shape of the annular portion 411 is geometrically similar to the shape of the first electrode E11, the shape of the annular portion 412 is geometrically similar to the shape of the second electrode E21, and the shape of the annular portion 413 is geometrically similar to the shape of the third electrode E31.

The annular portion 414 is equivalent to a part formed in a triangular shape by one side of each of the annular portions 411 to 413.

According to the configuration examples illustrated in FIG. 10 and FIG. 11, polarization components made incident on the electrode groups are scattered in twelve directions and polarization components made incident on the gap surrounded by the plurality of electrode groups are scattered in three directions.

Figure 12:
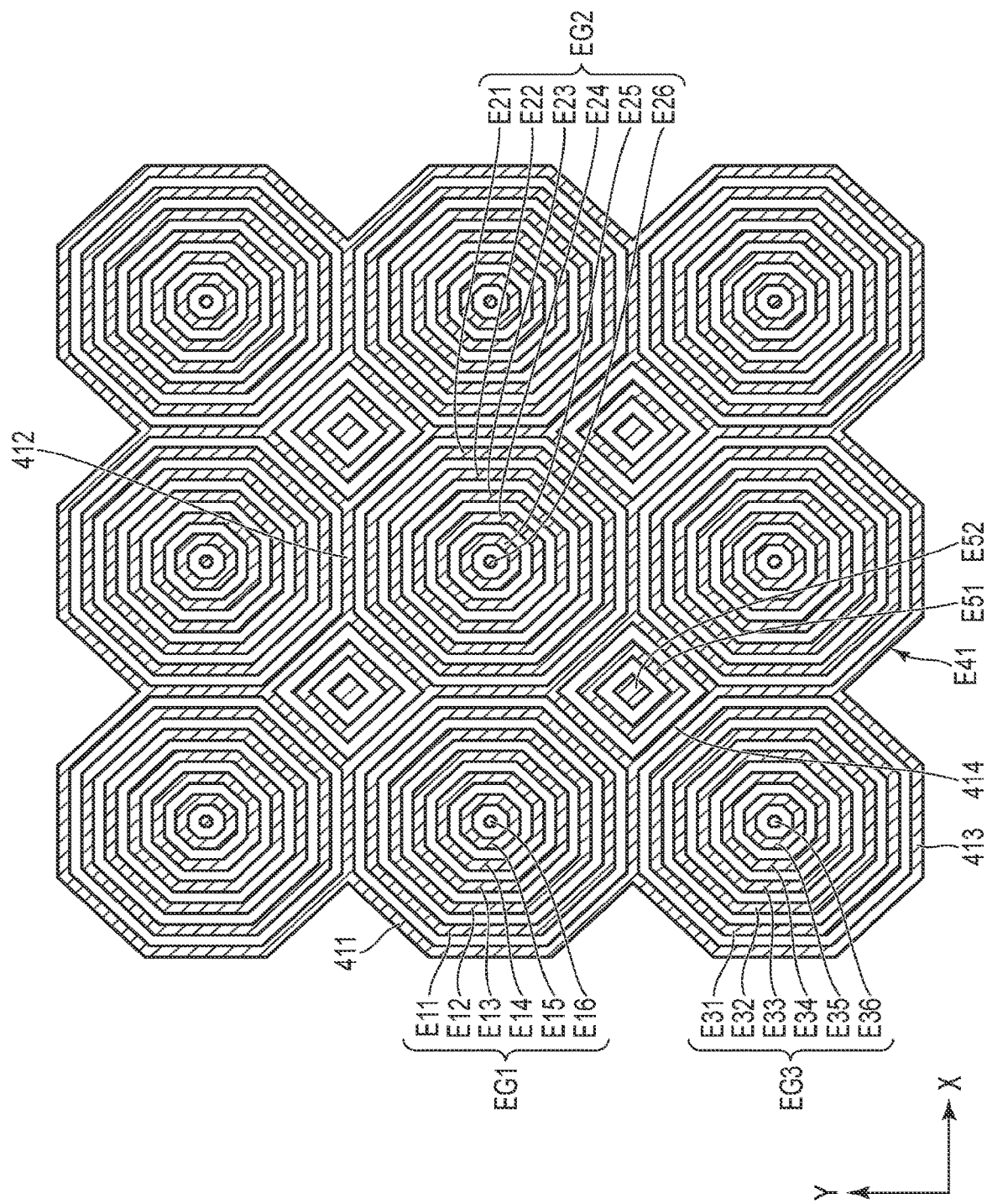
FIG. 12 is a plan view illustrating another configuration example of the first control electrode.

FIG. 12 is a plan view illustrating another configuration example of the first control electrode.

The electrode group EG1 is configured by the first control electrodes E11 to E16. All of the first control electrodes E11 to E16 are formed in an annular and polygonal shape and are formed in an octagonal shape in the illustrated example. The shape of each of the first control electrodes E11 to E16 is geometrically similar. The electrodes on the inner side are smaller. Like the electrode group EG1, the electrode group EG2 is configured by the first control electrodes E21 to E26 and the electrode group EG3 is configured by the first control electrodes E31 to E36.

These electrode groups EG1 to EG3 are disposed to form a close-packed structure as in the configuration example illustrated in FIG. 7. The electrode groups EG1 and EG2 are arranged in the first direction X and the electrode groups EG1 and EG3 are arranged in the second direction Y.

In the fourth electrode E41, the annular portions 411 to 413 are formed in an octagonal shape and the annular portion 414 is formed in a rectangular shape. The annular portion 411 surrounds the electrode group EG1 including the first electrode E11, the annular portion 412 surrounds the electrode group EG2 including the second electrode E21, and the annular portion 413 surrounds the electrode group EG3 including the third electrode E31. The shape of the annular portion 411 is geometrically similar to the shape of the first electrode E11, the shape of the annular portion 412 is geometrically similar to the shape of the second electrode E21, and the shape of the annular portion 413 is geometrically similar to the shape of the third electrode E31.

An electrode E51 on the inner side of the annular portion 414 is formed in a rectangular shape and has electric potential different from the electric potential of the fourth electrode E41. An electrode E52 on the inner side of the electrode E51 is formed in a rectangular shape and has electric potential different from the electric potential of the electrode E51.

According to the configuration example illustrated in FIG. 12, polarization components made incident on the electrode groups are scattered in eight directions and polarization components made incident on the gap surrounded by the plurality of electrode groups are scattered in four directions.

Figure 13:
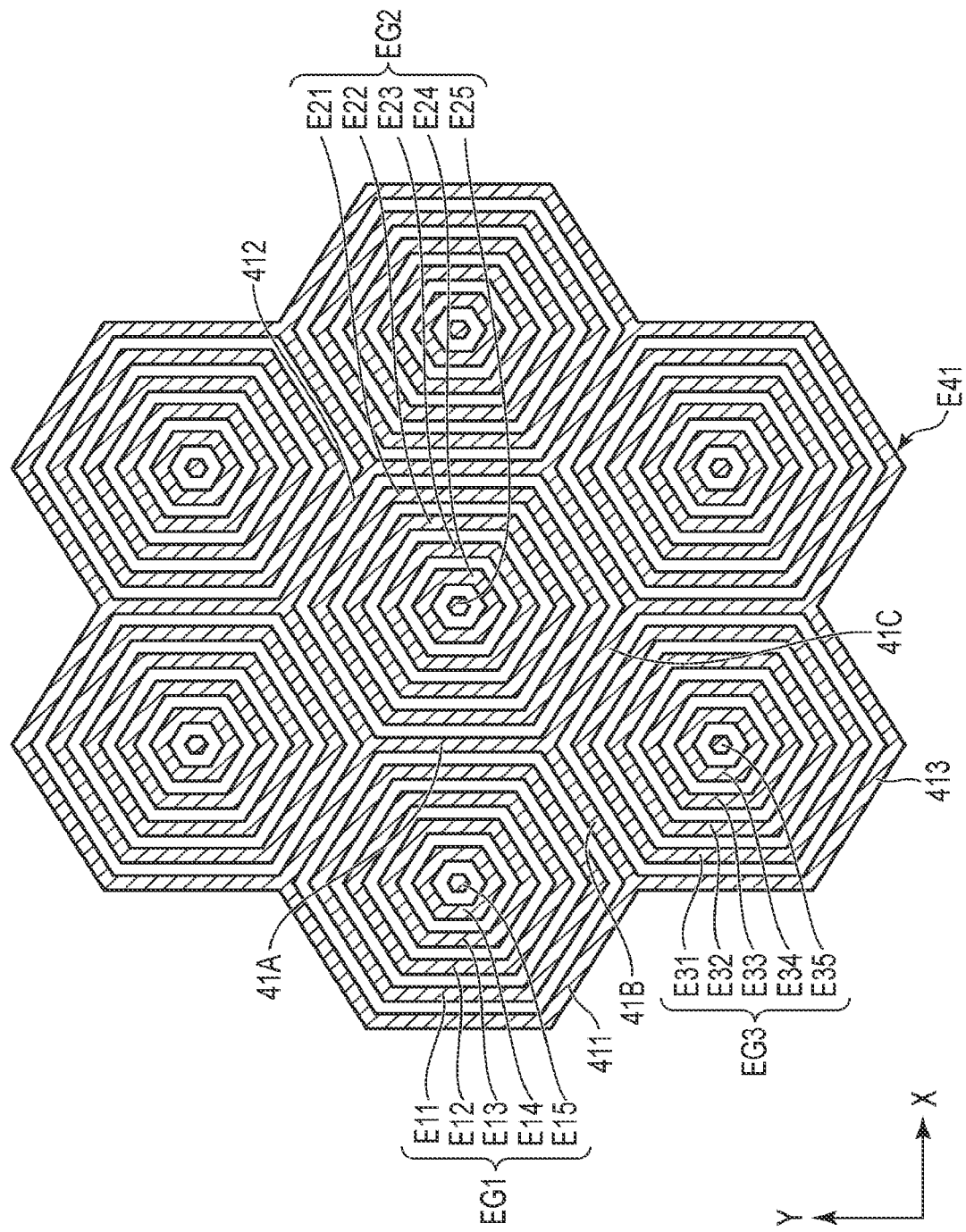
FIG. 13 is a plan view illustrating another configuration example of the first control electrode.

FIG. 13 is a plan view illustrating another configuration example of the first control electrode.

The electrode group EG1 is configured by the first control electrodes E11 to E15. All of the first control electrodes E11 to E15 are formed in an annular and polygonal shape and are formed in a hexagonal shape in the illustrated example. The shape of each of the first control electrodes E11 to E15 is geometrically similar. The electrodes on the inner side are smaller. Like the electrode group EG1, the electrode group EG2 is configured by the first control electrodes E21 to E25 and the electrode group EG3 is configured by the first control electrodes E31 to E35.

These electrode groups EG1 to EG3 are disposed to form a close-packed structure as in the configuration example illustrated in FIG. 7. When the electrode groups EG1 to EG3 have a hexagonal external shape, the electrode groups EG1 to EG3 are adjacent at substantially regular intervals. A gap larger than the interval is not formed.

In the fourth electrode E41, the annular portions 411 to 413 are formed in a hexagonal shape. The annular portion 411 surrounds the electrode group EG1 including the first electrode E11, the annular portion 412 surrounds the electrode group EG2 including the second electrode E21, and the annular portion 413 surrounds the electrode group EG3 including the third electrode E31. The shape of the annular portion 411 is geometrically similar to the shape of the first electrode E11, the shape of the annular portion 412 is geometrically similar to the shape of the second electrode E21, and the shape of the annular portion 413 is geometrically similar to the shape of the third electrode E31.

From another point of view, the fourth electrode E41 includes a linear part 41A extending between the first electrode E11 and the second electrode E21, a linear part 41B extending between the first electrode E11 and the third electrode E31, and a linear part 41C extending between the second electrode E21 and the third electrode E31.

According to the configuration example illustrated in FIG. 13, the polarization components made incident on the electrode groups are scattered in six directions. In addition, since almost no ineffective area is formed among the plurality of electrode groups, most of the polarization components made incident on the effective area can be scattered in six directions.

Figure 14:
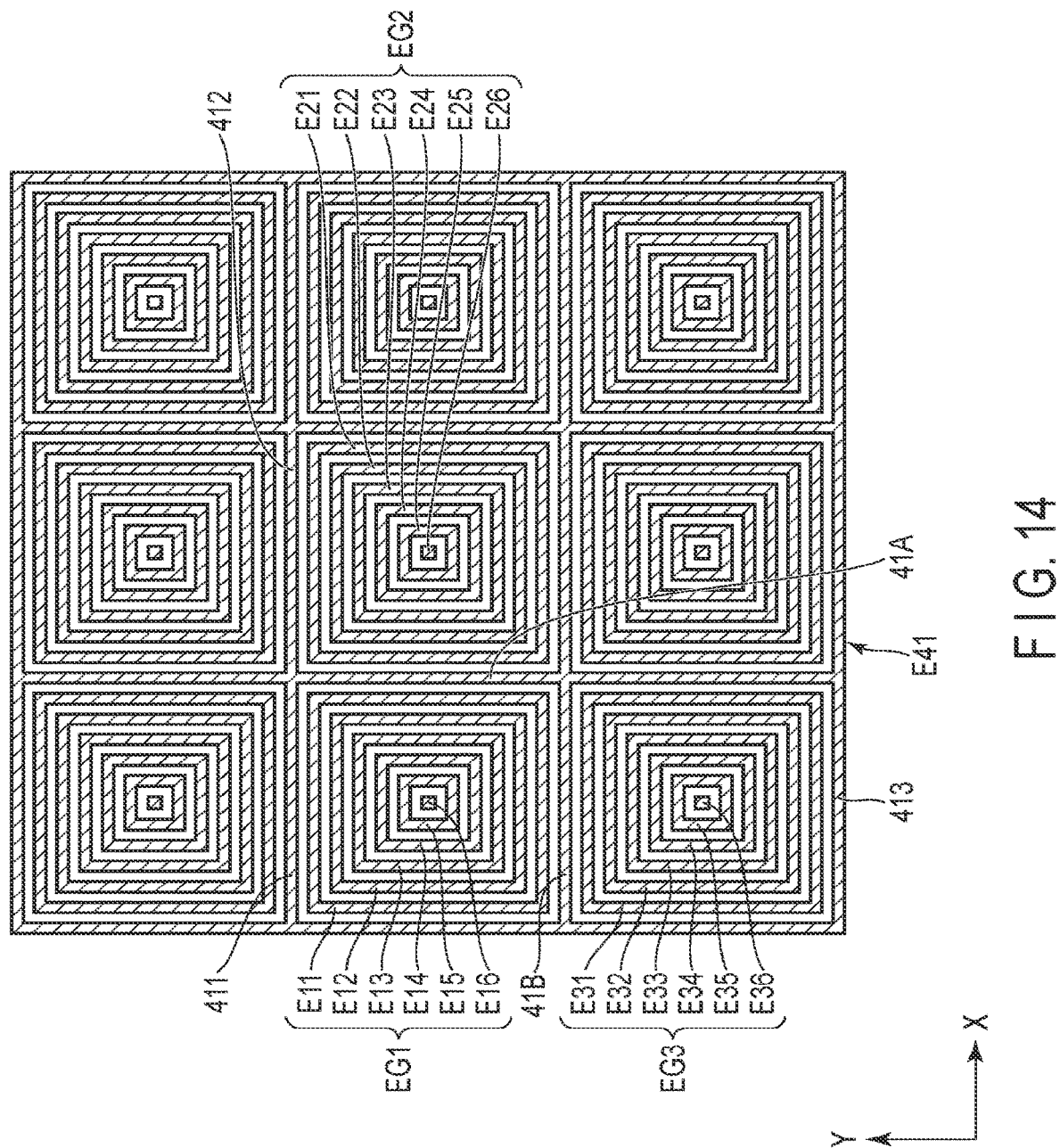
FIG. 14 is a plan view illustrating another configuration example of the first control electrode.

FIG. 14 is a plan view illustrating another configuration example of the first control electrode.

The electrode group EG1 is configured by the first control electrodes E11 to E16. All of the first control electrodes E11 to E16 are formed in an annular and polygonal shape and are formed in a rectangular shape in the illustrated example. The shape of each of the first control electrodes E11 to E16 is geometrically similar. The electrodes on the inner side are smaller. Like the electrode group EG1, the electrode group EG2 is configured by the first control electrodes E21 to E26 and the electrode group EG3 is configured by the first control electrodes E31 to E36.

The fourth electrode E41 is formed in a lattice shape. The annular portions 411 to 413 are formed in a rectangular shape. From another point of view, the fourth electrode E41 includes a linear part 41A extending between the first electrode E11 and the second electrode E21 and a linear part 41B extending between the first electrode E11 and the third electrode E31.

According to the configuration example illustrated in FIG. 14, the polarization components made incident on the electrode groups are scattered in four directions. In addition, since almost no ineffective are is formed among the plurality of electrode groups, most of the polarization components made incident on the effective area can be scattered in four directions.

Figure 15:
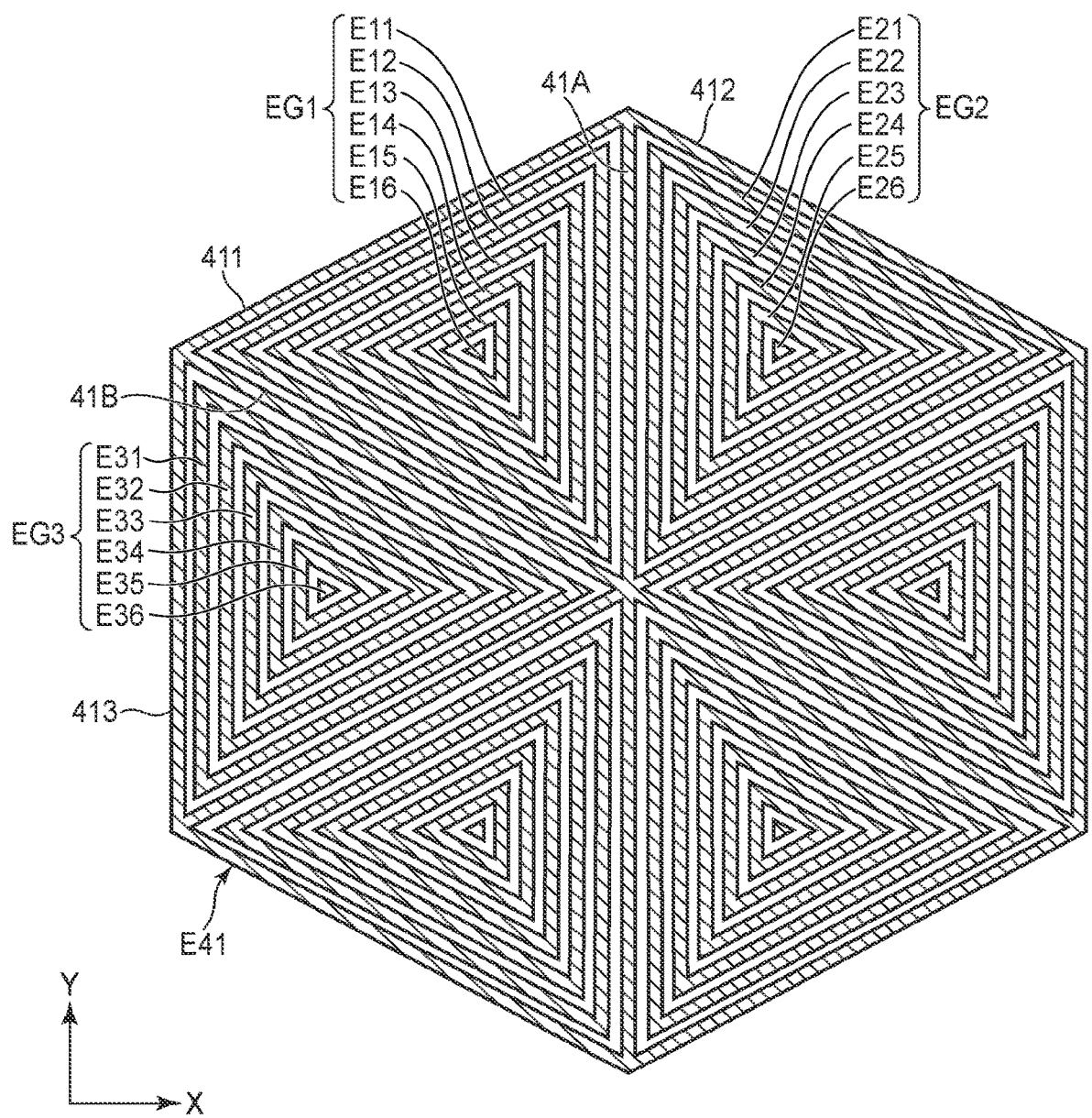
FIG. 15 is a plan view illustrating another configuration example of the first control electrode.

FIG. 15 is a plan view illustrating another configuration example of the first control electrode.

The electrode group EG1 is configured by the first control electrodes E11 to E16. All of the first control electrodes E11 to E16 are formed in an annular and polygonal shape and are formed in a triangular shape in the illustrated example. The shape of each of the first control electrodes E11 to E16 is geometrically similar. The electrodes on the inner side are smaller. Like the electrode group EG1, the electrode group EG2 is configured by the first control electrodes E21 to E26 and the electrode group EG3 is configured by the first control electrodes E31 to E36.

In the fourth electrode E41, the annular portions 411 to 413 are formed in a triangular shape. From another point of view, the fourth electrode E41 includes a linear part 41A extending between the first electrode E11 and the second electrode E21 and a linear part 418 extending between the first electrode E11 and the third electrode E31.

According to the configuration example illustrated in FIG. 15, the polarization components made incident on the electrode groups are scattered in three directions. In addition, since almost no ineffective area is formed among the plurality of electrode groups, most of the polarization components made incident on the effective area can be scattered in three directions.

Figure 16:
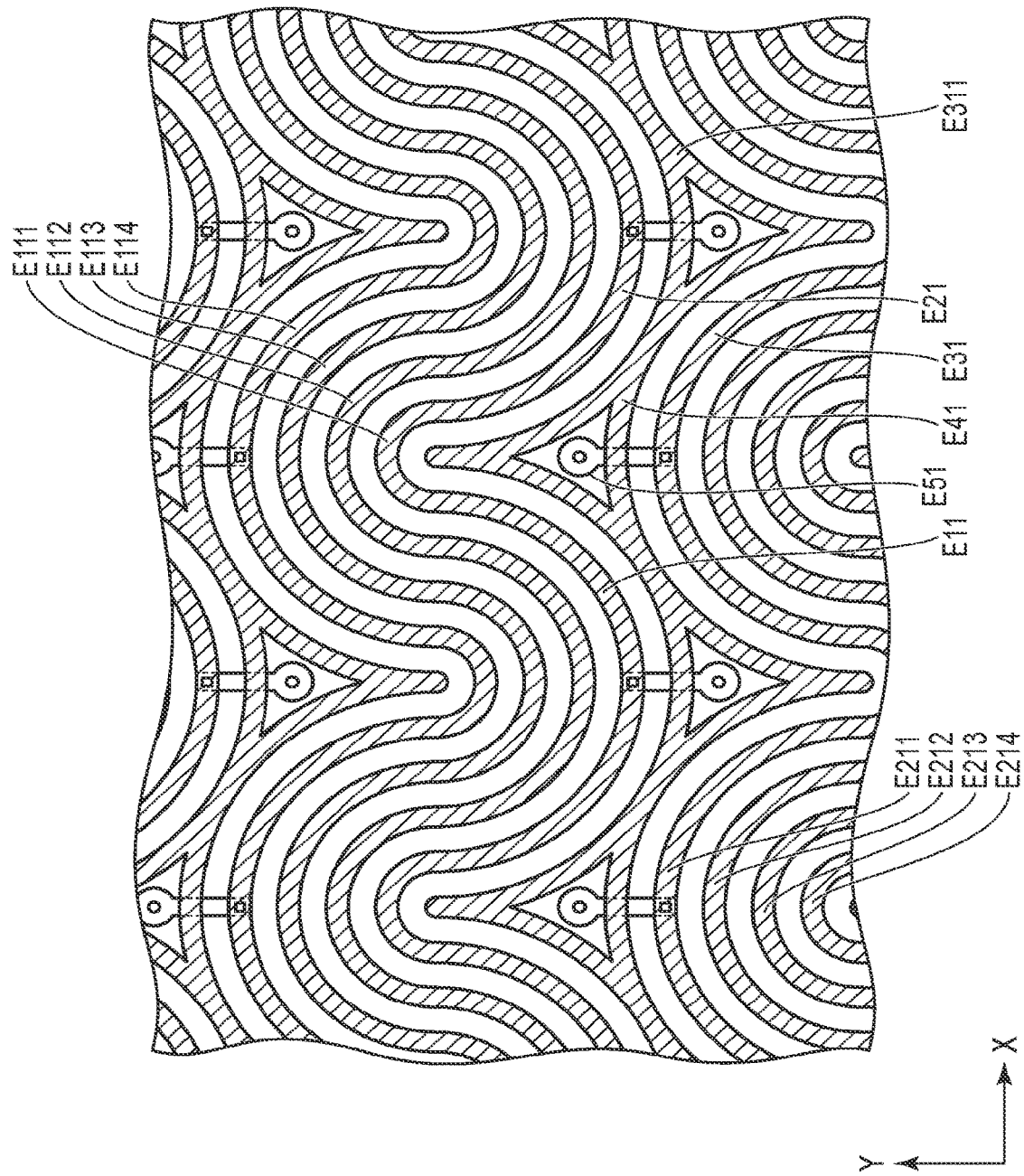
FIG. 16 is a plan view illustrating another configuration example of the first control electrode.

FIG. 16 is a plan view illustrating another configuration example of the first control electrode.

The configuration example illustrated in FIG. 16 is different compared with the configuration examples explained above in that the first control electrode E1 is a meandering electrode. A plurality of meandering electrodes E111 to E114 extend generally along the first direction X and are arranged in the second direction Y without intersecting one another. Similarly, a plurality of meandering electrodes E211 to E214 extend generally along the first direction X and are arranged in the second direction Y without intersecting one another. The meandering electrodes include electrode portions formed in a downward convex shape in FIG. 16 and electrode portions formed in an upward convex shape in FIG. 16. These electrode portions are alternately arranged and are connected to one another, whereby the meandering electrodes are configured.

For example, the meandering electrode E111 is equivalent to a first meandering electrode including the first electrode portion E11 and the second electrode portion E21. In addition, the meandering electrode E211 is equivalent to a second meandering electrode including the third electrode portion E31. The first electrode portion E11 and the second electrode portion E21 are arranged in the first direction X and formed in a convex shape ca downward convex shape in FIG. 16) toward the third electrode portion E31. The third electrode portion E31 is formed in a convex shape (an upward convex shape in FIG. 1.6) toward the first electrode portion E11 and the second electrode portion E21. In the example illustrated in FIG. 16, the first electrode portion E11, the second electrode portion E21, and the third electrode portion E31 are formed in an arcuate shape.

The meandering electrode E311 is equivalent to a third meandering electrode located between the meandering electrode E111 and the meandering electrode E211. The meander electrode 311 is an electrode to which a voltage different from voltages applied to the meander electrodes E111 and E211 is applied. The meandering electrode E311 includes a fourth electrode portion E41 surrounded by the first electrode portion E11, the second electrode portion E21, and the third electrode portion E31. The fourth electrode portion E41 is configured by parts formed in an arcuate shape to respectively extend along the first electrode portion E11, the second electrode portion E21, and the third electrode portion E31.

The electrode E51 is located on the inner side the fourth electrode portion E41 and is electrically connected to the third electrode portion E31.

In such a configuration example, the electrode portions arranged in the first direction X are connected to one another and a conductive line for connecting the adjacent electrode portions is unnecessary.

Figure 17:
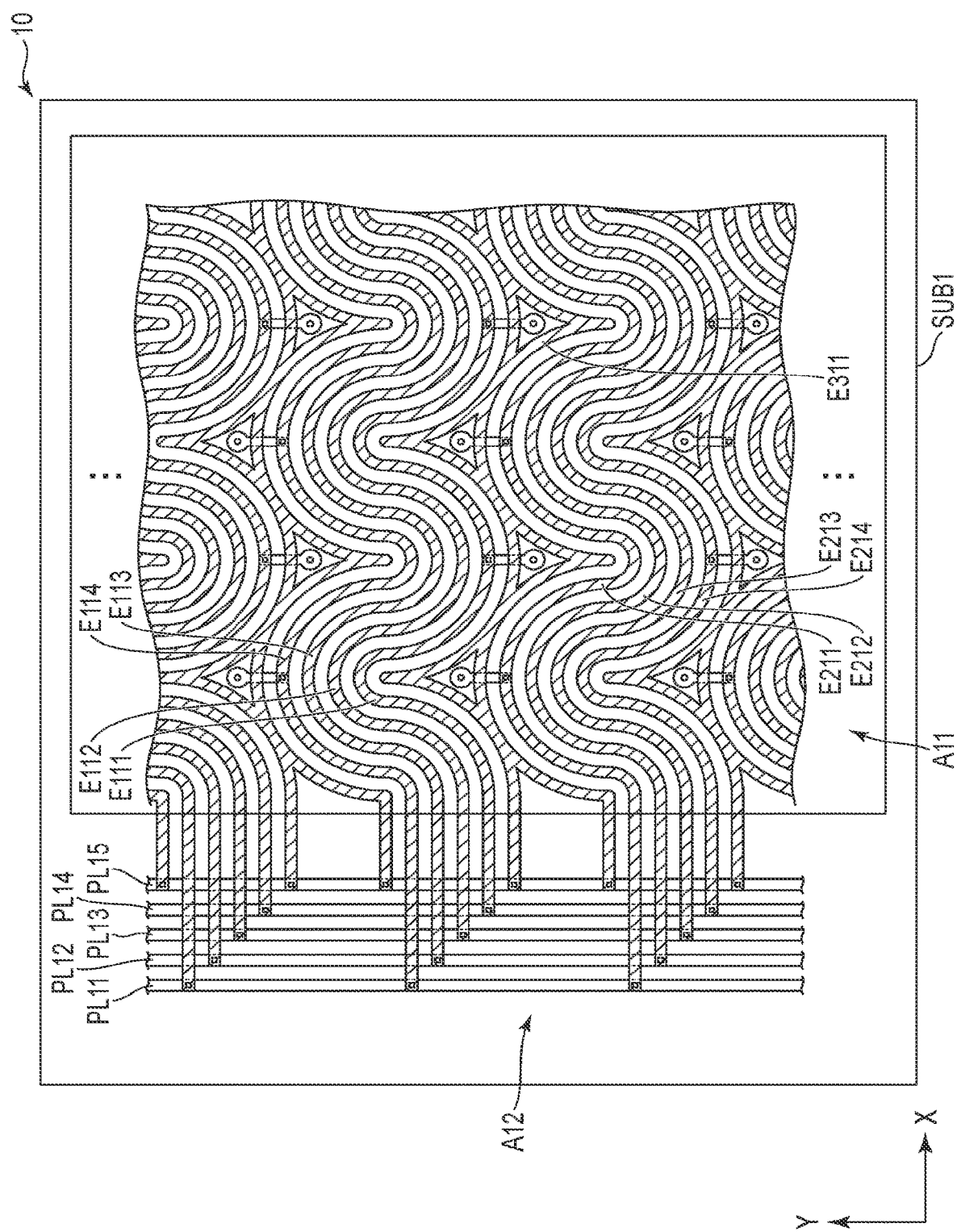
FIG. 17 is a plan view illustrating the first liquid crystal cell 10 including the first control electrode in FIG. 16.

FIG. 17 is a plan view illustrating first liquid crystal cell 10 including the first control electrode in FIG. 16.

The meandering electrodes E111 to E114, the meanderinq electrodes E211 to E214, and the meandering electrode E311 extend along the first direction X without being disconnected in the effective area A11. In other words, the conductive line explained in the configuration example explained above is not provided in the effective area A11. In addition, the meandering electrodes E111 to E114, the meandering electrodes E211 to E214, and the meandering electrode E311 extend to the peripheral area A12 and are electrically connected to any one of the feeder lines PL11 to PL15.

According to the configuration example illustrated in FIG. 16 and FIG. 17, since the conductive line is not provided in the effective area A11, disorder in alignment of liquid crystal molecules due to a leakage field from the conductive line is prevented. Therefore, a desired liquid crystal lens is formed.

In addition, such a configuration example is equivalent to, for example, for each of the circular electrode groups EG illustrated in FIG. 7, a semicircular part of a lower half is shifted by a distance equivalent to the radius of the electrode group EG in the first direction X with respect to a semicircular part of an upper half. Therefore, in the configuration examples illustrated in FIG. 16 and FIG. 17, the same scattering characteristics as the scattering characteristics in the configuration example illustrated in FIG. 7 can be obtained.

Figure 18:
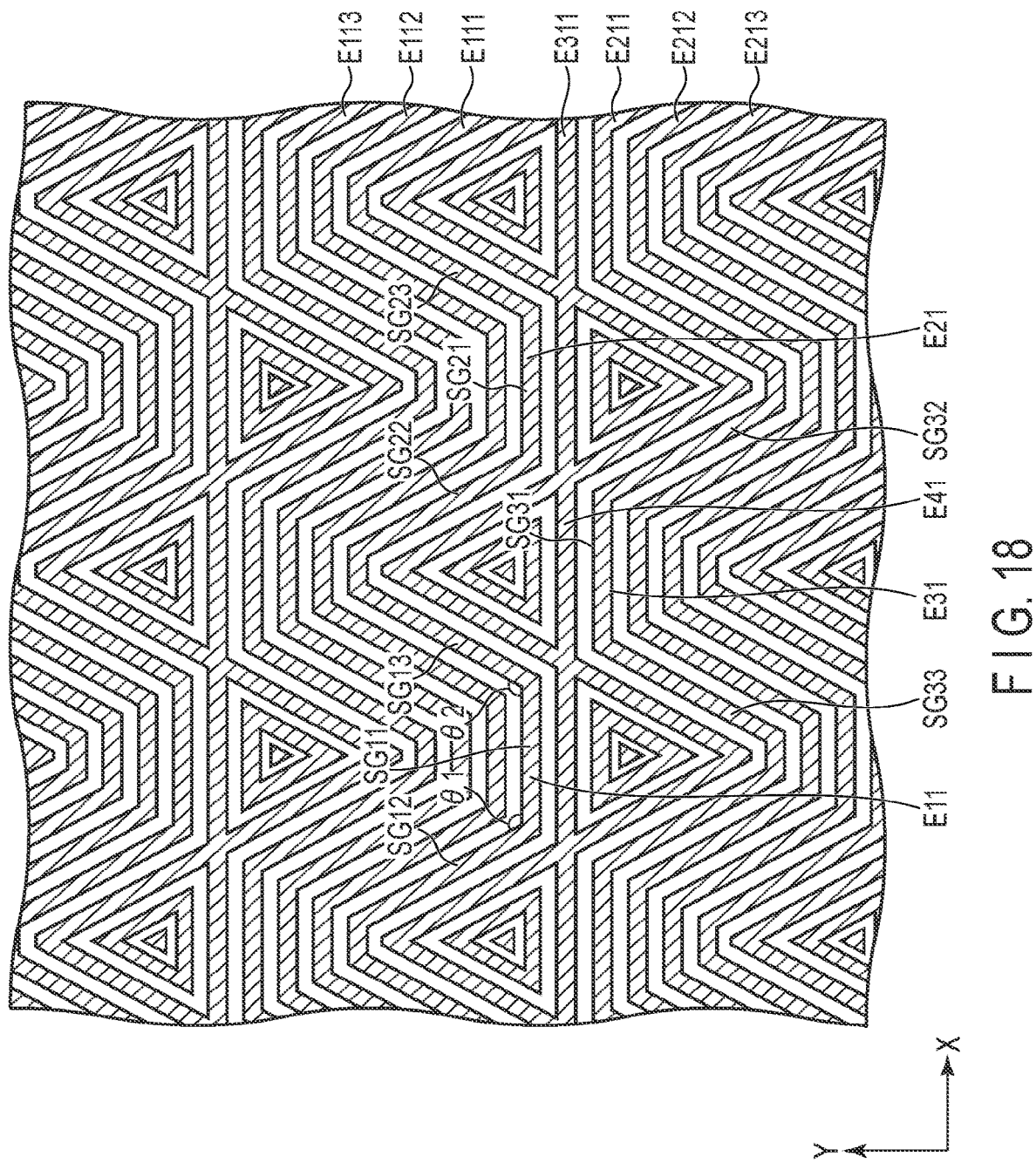
FIG. 18 is a plan view illustrating another configuration example of the first control electrode.

FIG. 18 is a plan view illustrating another configuration example of the first control electrode.

The configuration example illustrated in FIG. 18 is different compared with the configuration example illustrated in FIG. 16 in that electrode portions of a meander electrode is formed in a polygonal shape.

For example, in the meandering electrode E111, the first electrode portion E11 and the second electrode portion E21 are formed in an substantially square bracket shape convex downward in FIG. 18. More specifically, for example, the first electrode portion E11 includes three segments SG11 to SG13 as linear parts. The segment SG11 extends along the first direction X, the segment SG12 is connected to one end portion of the segment SG11, and the segment SG13 is connected to the other end portion of the segment SG11. Each of the segments SG12 and SG13 extends in a direction different from the first direction X and the second direction Y. Both of an angle θ1 formed by the segment SG11 and the segment SG12 and an angle θ2 formed by the segment SG11 and the segment SG13 are obtuse angles. For example, the angles θ1 and θ2 are substantially equal. The second electrode portion E21 is also configured by the same three segments SG21 to SG23 as those of the first electrode portion E11.

In the meandering electrode E211, the third electrode portion E31 is formed in an substantially square bracket shape convex upward in FIG. 18. In the third electrode portion E31, the segment SG31 is substantially parallel to the segment SG11, the segment SG32 is substantially parallel to the segment SG12, and the segment SG33 is substantially parallel to the segment SG13.

The meandering electrode E311 includes a fourth electrode portion E41 surrounded by the first electrode portion E11, the second electrode portion E21, and the third electrode portion E31. The fourth electrode portion E41 is formed in a triangular shape respectively extending along the first electrode portion E11, the second electrode portion E21, and the third electrode portion E311. In other words, each of the first electrode portion E11, the second electrode portion E21, and the third electrode portion E31 includes the segment SG13, the segment SG22, and the segment SG31 as linear parts adjacent to the fourth electrode portion E41.

In such a configuration example as well, the same effects as those of the configuration example explained above can be obtained.

Figure 19:
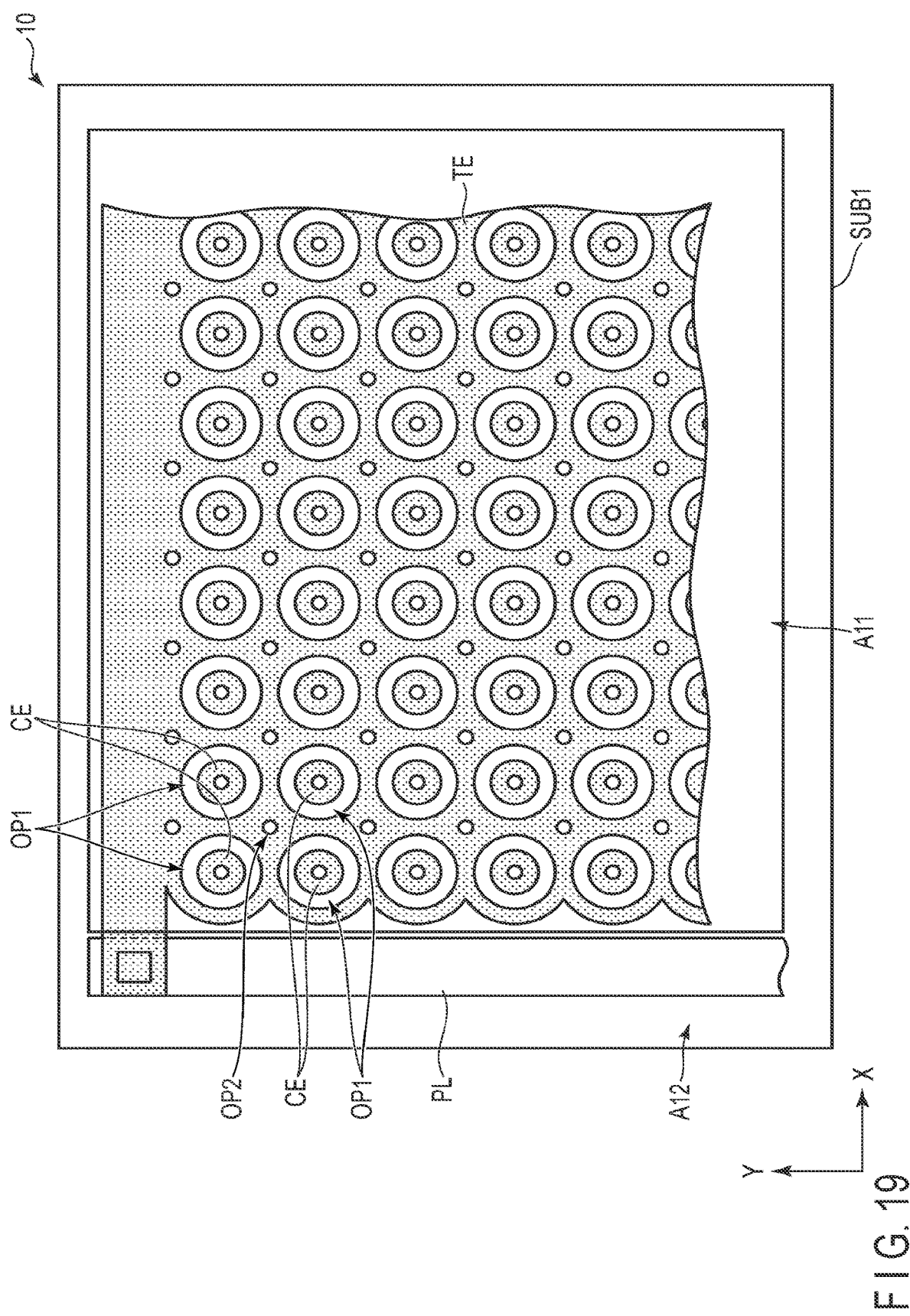
FIG. 19 is a plan view illustrating another configuration example of the first liquid crystal cell 10.

FIG. 19 is a plan view illustrating another configuration example of first liquid crystal cell 10.

the first substrate SUB1 includes a transparent electrode TE formed over substantially the entire area of the effective area A11. The transparent electrode TE is electrically connected to the feeder line PL in the peripheral area A12. The transparent electrode TE includes two types of opening portions OP1 and OP2. In the illustrated example, each of the opening portions OP1 and OP2 is a circle. However, each of the opening portions OP1 and OP2 may be a polygon. The opening portion OP1 and the opening portions OP2 may have different shapes. The diameter of the opening portion OP1 is larger than the diameter of the opening portion OP2.

A plurality of opening portions OP1 are arranged in a matrix shape in the first direction X and the second direction Y. In addition, a plurality of opening portions OP2 are arranged in a matrix shape in positions different from the opening portions OP1. From another point of view, one opening portion OP2 is located on the inner side surrounded by four opening portions OP1.

A circular electrode CE formed concentrically with the opening portion OP1 is provided on the inner side of the opening portion OP1. The electrode CE is formed by the same transparent conductive material as the transparent conductive material of the transparent electrode TE. A voltage different from the voltage applied to the transparent electrode TE is applied to the electrode CE. The same liquid crystal lens as the liquid crystal lens of the configuration example explained above is formed.

In such a configuration example as well, the same effects as those of the configuration example explained above can be obtained.

FIG. 20 is a plan view illustrating another configuration example of first liquid crystal cell 10.

The first substrate SUB1 of the first liquid crystal cell 10 includes a plurality of feeder lines PL11 and PL12, a plurality of conductive lines CD11 and CD12, and a plurality of electrode groups EG1 and EG2.

In the electrode group EG1, adjacent control electrodes are provided in different layers. For example, the first control electrodes E11, E13, E15, and E17 are located in the same layer and provided between the insulating substrate 11 and the insulating film IL illustrated in FIG. 8. The first control electrodes E12, E14, E1, and E18 are located in the same layer and provided between the insulating film IL and the alignment film AL1 illustrated in FIG. 8.

In the electrode group EG2 as well, adjacent control electrodes are provided in different layers. However, the first control electrode E21 is configured to have electric potential different from the electric potential of the adjacent first control electrode E11. For example, the first control electrodes E22, E24, E26, and E28 are provided between the insulating substrate 11 and the insulating film IL illustrated in FIG. 8. The first control electrodes E21, E23, E25, and E27 are provided between the insulating film IT and the alignment film AL1 illustrated in FIG. 8.

The feeder lines PL11 and PL12 are, for example, conductive layers located between the insulating substrate 11 and the insulating film IL.

The conductive line CD11 is provided in a layer different from the conductive line CD12. For example, the conductive line CD11 is provided between the insulating substrate 11 and the insulating film IL and the conductive line CD12 is provided between the insulating film IL and the alignment film AL1. For this reason, the conductive lines CD11 and CD12 are disposed to overlap each other in the plan view.

The conductive line CD11 is located in the same layer as the first control electrodes E11, E13, E15, E17, E22, E24, E26, and E28 and formed integrally with these first control electrodes. In addition, the conductive line CD11 is integrally formed with the feeder line PL11 and electrically connected to the feeder line PL11. In addition, the conductive line CD11 intersects the first control electrodes E12, E14, E16, E18, E21, E23, E25, and E27.

The conductive line CD12 is located in the same layer as the first control electrodes E12, E14, E16, E18, E21, E23, E25, and E27 and formed integrally with these first control electrodes. In addition, the conductive line CD12 intersects the feeder line PL11 and is electrically connected to the feeder line PL12. In addition, the conductive line CD12 intersects the first control electrodes E11, E13, E15, E17, E22, E24, E26, and E28.

In such a configuration example as well, the same effects as those of the configuration example explained above can be obtained. In addition, a contact hole for connecting the control electrodes and the conductive line becomes unnecessary. In addition, since the conductive line CD11 is provided in a layer different from the conductive line CD12, the conductive lines CD11 and CD12 can be arranged to overlap each other in the plan view. Consequently, a setting area of the conductive line can be reduced. A disorder in alignment of liquid crystal molecules due to a leakage field from the conductive line is suppressed.

As explained d above, according to the present embodiment, it is possible to provide a light control device and an illumination device capable of reducing an ineffective area.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A light control device comprising:
    a first substrate including first to third electrodes formed in an annular shape and a fourth electrode;
    a second substrate; and
    a liquid crystal layer held between the first substrate and the second substrate, wherein
    the first electrode and the second electrode are arranged in a first direction,
    the first electrode and the third electrode are arranged in a direction different from the first direction,
    the fourth electrode is adjacent to the first to third electrodes,
    the first substrate further includes a first conductive line intersecting the first electrode and the second electrode, a second conductive line intersecting the third electrode, and an insulating film provided between the first and second conductive lines and the first to fourth electrodes,
    the first electrode and the second electrode are electrically connected to the first conductive line,
    the third electrode is electrically connected to the second conductive line, and
    the fourth electrode is located between the first conductive line and the second conductive line and is configured to have electric potential different from electric potentials of the first to third electrodes.

2. The light control device according to claim 1, wherein
    the first electrode and the second electrode are line symmetry with respect to a first symmetry axis orthogonal to the first direction, and
    the first electrode and the third electrode are line symmetry with respect to a second symmetry axis different from the first symmetry axis.

3. The light control device according to claim 1, wherein
    the first to fourth electrodes are formed in a circular shape, and
    the fourth electrode is smaller than the first to third electrodes.

4. The light control device according to claim 3, wherein the first substrate further includes a plurality of electrodes formed in a concentric circle shape on an inner side of each of the first to third electrodes.

5. A light control device comprising:
    a first substrate including first to third electrodes formed in an annular shape and a fourth electrode;
    a second substrate; and
    a liquid crystal layer held between the first substrate and the second substrate, wherein
    the first electrode and the second electrode are arranged in a first direction,
    the first electrode and the third electrode are arranged in a direction different from the first direction,
    the fourth electrode is adjacent to the first to third electrodes,
    the first to third electrodes are formed in a polygonal shape, and
    the fourth electrode includes a part formed in a polygonal shape different from the first electrode.

6. The light control device according to claim 5, wherein
    the first to third electrodes are formed in a dodecagonal shape, and
    the fourth electrode includes a part formed in a triangular shape.

7. The light control device according to claim 5, wherein
    the first to third electrodes are formed in an octagonal shape, and
    the fourth electrode includes a part formed in a rectangular shape.

8. The light control device according to claim 5, wherein the fourth electrode includes annular portions formed in annular shapes respectively surrounding the first to third electrodes.

9. The light control device according to claim 8, wherein a shape of the annular portion surrounding the first electrode is geometrically similar to a shape of the first electrode.

10. A light control device comprising:
    a first substrate including first to third electrodes formed in an annular shape and a fourth electrode;
    a second substrate; and
    a liquid crystal layer held between the first substrate and the second substrate, wherein
    the first electrode and the second electrode are arranged in a first direction,
    the first electrode and the third electrode are arranged in a direction different from the first direction,
    the fourth electrode is adjacent to the first to third electrodes,
    the first to third electrodes are formed in a polygonal shape, and
    the fourth electrode includes parts respectively extending between the first electrode and the second electrode and between the first electrode and the third electrode.

11. The light control device according to claim 10, wherein the first to third electrodes are formed in a polygonal shape of any of a hexagonal shape, a rectangular shape, and a triangular shape.

12. A light control device comprising:
a first substrate including first to third electrodes formed in an annular shape and a fourth electrode;
a second substrate; and
a liquid crystal layer held between the first substrate and the second substrate, wherein
the first electrode and the second electrode are arranged in a first direction,
the first electrode and the third electrode are arranged in a direction different from the first direction,
the fourth electrode is adjacent to the first to third electrodes,
the first substrate further includes:
a first conductive line that intersects the first electrode and is formed integrally with the second electrode;
a second conductive line that intersects the second electrode and is formed integrally with the first electrode; and
an insulating film provided between the second electrode and the first electrode and between the first conductive line and the second conductive line, and
the first conductive line and the second conductive line overlap in a plan view.

13. A light control device comprising:
a first liquid crystal cell configured to control a first polarization component of incident natural light; and
a second liquid crystal cell configured to control a second polarization component of the incident natural light, wherein
the second liquid crystal cell overlaps the first liquid crystal cell,
each of the first liquid crystal cell and the second liquid crystal cell includes first to third electrodes formed in an annular shape and a fourth electrode,
the first electrode and the second electrode are arranged in a first direction,
the first electrode and the third electrode are arranged in a direction different from the first direction, and
the fourth electrode is adjacent to the first to third electrodes.

14. A light control device comprising:
a first substrate including a first meandering electrode including a first electrode portion and a second electrode portion, a second meandering electrode including a third electrode portion, and a third meandering electrode located between the first meandering electrode and the second meandering electrode;
a second substrate; and
a liquid crystal layer held between the first substrate and the second substrate, wherein
the first electrode portion and the second electrode portion are arranged in a first direction,
the first electrode portion and the third electrode portion are arranged in a direction different from the first direction,
the first electrode portion and the second electrode portion are formed in a convex shape toward the third electrode portion,
the third electrode portion is formed in a convex shape toward the first electrode portion and the second electrode portion, and
the third meandering electrode includes a fourth electrode portion surrounded by the first to third electrode portions.

15. The light control device according to claim 14, wherein the first to third electrode portions are formed in an arc shape.

16. The light control device according to claim 14, wherein each of the first to third electrode portions includes a linear part adjacent to the fourth electrode portion.

17. An illumination device comprising:
a light source;
a light control device configured to control light emitted from the light source, wherein
the light control device includes:
a first liquid crystal cell configured to control a first polarization component of incident natural light; and
a second liquid crystal cell configured to control a second polarization component of the incident natural light,
the second liquid crystal cell overlaps the first liquid crystal cell,
each of the first liquid crystal cell and the second liquid crystal cell includes first to third electrodes formed in an annular shape and a fourth electrode,
the first electrode and the second electrode are arranged in a first direction,
the first electrode and the third electrode are arranged in a direction different from the first direction, and
the fourth electrode is adjacent to the first to third electrodes.

18. An illumination device comprising:
a light source; and
a light control device configured to control light emitted from the light source, wherein
the light control device includes:
a first substrate including a first meandering electrode including a first electrode portion and a second electrode portion, a second meandering electrode including a third electrode portion, and a third meandering electrode located between the first meandering electrode and the second meandering electrode;
a second substrate; and
a liquid crystal layer held between the first substrate and the second substrate,
the first electrode portion and the second electrode portion are arranged in a first direction,
the first electrode portion and the third electrode portion are arranged in a direction different from the first direction,
the first electrode portion and the second electrode portion are formed in a convex shape toward the third electrode portion,
the third electrode portion is formed in a convex shape toward the first electrode portion and the second electrode portion, and
the third meandering electrode includes a fourth electrode portion surrounded by the first to third electrode portions.

* * * * *